US011931803B2

(12) United States Patent
Cooper

(10) Patent No.: US 11,931,803 B2
(45) Date of Patent: Mar. 19, 2024

(54) MOLTEN METAL TRANSFER SYSTEM AND METHOD

(71) Applicant: Molten Metal Equipment Innovations, LLC, Middlefield, OH (US)

(72) Inventor: Paul V. Cooper, Chesterland, OH (US)

(73) Assignee: Molten Metal Equipment Innovations, LLC

( * ) Notice: Subject to any disclaimer, the term of this patent is extended or adjusted under 35 U.S.C. 154(b) by 0 days.

(21) Appl. No.: 18/114,665

(22) Filed: Feb. 27, 2023

(65) Prior Publication Data

US 2023/0219132 A1 Jul. 13, 2023

Related U.S. Application Data

(63) Continuation of application No. 16/877,364, filed on May 18, 2020.

(Continued)

(51) Int. Cl.

*B22D 41/00* (2006.01)

*B22D 35/04* (2006.01)

(Continued)

(52) U.S. Cl.

CPC ............ *B22D 41/00* (2013.01); *B22D 35/04* (2013.01); *B22D 39/02* (2013.01); *F04D 7/065* (2013.01); *F04D 29/026* (2013.01); *F27B 3/045* (2013.01); *F27D 3/14* (2013.01); *F27D 27/005* (2013.01); *B22D 39/00* (2013.01); *F04D 29/426* (2013.01);

(Continued)

(58) Field of Classification Search

CPC ........ B22D 41/00; B22D 35/04; F04D 29/426

See application file for complete search history.

(56) References Cited

U.S. PATENT DOCUMENTS

| | | | |
|---|---|---|---|
| 35,604 | A | 6/1862 | Guild |
| 116,797 | A | 7/1871 | Barnhart |

(Continued)

FOREIGN PATENT DOCUMENTS

| | | |
|---|---|---|
| CA | 683469 | 3/1964 |
| CA | 2115929 | 8/1992 |

(Continued)

OTHER PUBLICATIONS

"Response to Final Office Action and Request for Continued Examination for U.S. Appl. No. 09/275,627," including Declarations of Haynes and Johnson, dated Apr. 16, 2001.

(Continued)

*Primary Examiner* — Scott R Kastler

(74) *Attorney, Agent, or Firm* — SNELL & WILMER L.L.P.

(57) ABSTRACT

A system according to aspects of the invention includes a pump and a refractory casing that houses the pump or is in fluid communication with the pump. As the pump operates it moves molten metal upward through an uptake section of the casing until it reaches a rectangular outlet wherein it exits the vessel. The rectangular outlet is configured to be connected to, or may be attached to, a launder. Another system uses a wall to divide a cavity of the chamber into two portions. The wall has an opening and a pump pumps molten metal from a first portion into a second portion until the level in the second portion reaches an outlet and exits the vessel.

20 Claims, 22 Drawing Sheets

Related U.S. Application Data

(60) Provisional application No. 62/852,846, filed on May 24, 2019, provisional application No. 62/849,787, filed on May 17, 2019.

(51) Int. Cl.

| | |
|---|---|
| *B22D 39/00* | (2006.01) |
| *B22D 39/02* | (2006.01) |
| *F04D 7/06* | (2006.01) |
| *F04D 29/02* | (2006.01) |
| *F04D 29/42* | (2006.01) |
| *F27B 3/04* | (2006.01) |
| *F27D 3/00* | (2006.01) |
| *F27D 3/14* | (2006.01) |
| *F27D 27/00* | (2010.01) |

(52) U.S. Cl.
CPC ................ *F27D 2003/0054* (2013.01); *F27M 2001/012* (2013.01)

(56) References Cited

U.S. PATENT DOCUMENTS

| | | | |
|---|---|---|---|
| 209,219 | A | 10/1878 | Bookwalter |
| 251,104 | A | 12/1881 | Finch |
| 307,845 | A | 11/1884 | Curtis |
| 364,804 | A | 6/1887 | Cole |
| 390,319 | A | 10/1888 | Thomson |
| 495,760 | A | 4/1893 | Seitz |
| 506,572 | A | 10/1893 | Wagener |
| 585,188 | A | 6/1897 | Davis |
| 757,932 | A | 4/1904 | Jones |
| 882,477 | A | 3/1908 | Neumann |
| 882,478 | A | 3/1908 | Neumann |
| 890,319 | A | 6/1908 | Wells |
| 898,499 | A | 9/1908 | O'Donnell |
| 909,774 | A | 1/1909 | Flora |
| 919,194 | A | 4/1909 | Livingston |
| 1,037,659 | A | 9/1912 | Rembert |
| 1,100,475 | A | 6/1914 | Franckaerts |
| 1,170,512 | A | 2/1916 | Chapman |
| 1,196,758 | A | 9/1916 | Blair |
| 1,304,068 | A | 5/1919 | Krogh |
| 1,331,997 | A | 2/1920 | Neal |
| 1,185,314 | A | 3/1920 | London |
| 1,377,101 | A | 5/1921 | Sparling |
| 1,380,798 | A | 6/1921 | Hansen et al. |
| 1,439,365 | A | 12/1922 | Hazell |
| 1,454,967 | A | 5/1923 | Gill |
| 1,470,607 | A | 10/1923 | Hazell |
| 1,513,875 | A | 11/1924 | Wilke |
| 1,518,501 | A | 12/1924 | Gill |
| 1,522,765 | A | 1/1925 | Wilke |
| 1,526,851 | A | 2/1925 | Hall |
| 1,669,668 | A | 5/1928 | Marshall |
| 1,673,594 | A | 6/1928 | Schmidt |
| 1,697,202 | A | 1/1929 | Nagle |
| 1,717,969 | A | 6/1929 | Goodner |
| 1,718,396 | A | 6/1929 | Wheeler |
| 1,896,201 | A | 2/1933 | Sterner-Rainer |
| 1,988,875 | A | 1/1935 | Saborio |
| 2,013,455 | A | 9/1935 | Baxter |
| 2,035,282 | A | 3/1936 | Schmeller, Sr. |
| 2,038,221 | A | 4/1936 | Kagi |
| 2,075,633 | A | 3/1937 | Anderegg |
| 2,090,162 | A | 8/1937 | Tighe |
| 2,091,677 | A | 8/1937 | Fredericks |
| 2,138,814 | A | 12/1938 | Bressler |
| 2,173,377 | A | 9/1939 | Schultz, Jr. et al. |
| 2,264,740 | A | 12/1941 | Brown |
| 2,280,979 | A | 4/1942 | Rocke |
| 2,290,961 | A | 7/1942 | Heuer |
| 2,300,688 | A | 11/1942 | Nagle |
| 2,304,849 | A | 12/1942 | Ruthman |
| 2,368,962 | A | 2/1945 | Blom |
| 2,383,424 | A | 8/1945 | Stepanoff |
| 2,423,655 | A | 7/1947 | Mars et al. |
| 2,488,447 | A | 11/1949 | Tangen et al. |
| 2,493,467 | A | 1/1950 | Sunnen |
| 2,515,097 | A | 7/1950 | Schryber |
| 2,515,478 | A | 7/1950 | Tooley et al. |
| 2,528,208 | A | 10/1950 | Bonsack et al. |
| 2,528,210 | A | 10/1950 | Stewart |
| 2,543,633 | A | 2/1951 | Lamphere |
| 2,566,892 | A | 4/1951 | Jacobs |
| 2,625,720 | A | 1/1953 | Ross |
| 2,626,086 | A | 1/1953 | Forrest |
| 2,676,279 | A | 4/1954 | Wilson |
| 2,677,609 | A | 4/1954 | Moore et al. |
| 2,698,583 | A | 1/1955 | House et al. |
| 2,714,354 | A | 8/1955 | Farrand |
| 2,762,095 | A | 9/1956 | Pemetzrieder |
| 2,768,587 | A | 10/1956 | Corneil |
| 2,775,348 | A | 12/1956 | Williams |
| 2,779,574 | A | 1/1957 | Schneider |
| 2,787,873 | A | 4/1957 | Hadley |
| 2,808,782 | A | 10/1957 | Thompson et al. |
| 2,809,107 | A | 10/1957 | Russell |
| 2,821,472 | A | 1/1958 | Peterson et al. |
| 2,824,520 | A | 2/1958 | Bartels |
| 2,832,292 | A | 4/1958 | Edwards |
| 2,839,006 | A | 6/1958 | Mayo |
| 2,853,019 | A | 9/1958 | Thornton |
| 2,865,295 | A | 12/1958 | Nikolaus |
| 2,865,618 | A | 12/1958 | Abell |
| 2,868,132 | A | 1/1959 | Rittershofer |
| 2,901,006 | A | 8/1959 | Andrews |
| 2,901,677 | A | 8/1959 | Chessman et al. |
| 2,906,632 | A | 9/1959 | Nickerson |
| 2,918,876 | A | 12/1959 | Howe |
| 2,948,524 | A | 8/1960 | Sweeney et al. |
| 2,958,293 | A | 11/1960 | Pray, Jr. |
| 2,966,345 | A | 12/1960 | Burgoon et al. |
| 2,966,381 | A | 12/1960 | Menzel |
| 2,978,885 | A | 4/1961 | Davison |
| 2,984,524 | A | 5/1961 | Franzen |
| 2,987,885 | A | 6/1961 | Hodge |
| 3,010,402 | A | 11/1961 | King |
| 3,015,190 | A | 1/1962 | Arbeit |
| 3,039,864 | A | 6/1962 | Hess |
| 3,044,408 | A | 7/1962 | Mellott |
| 3,048,384 | A | 8/1962 | Sweeney et al. |
| 3,070,393 | A | 12/1962 | Silverberg et al. |
| 3,092,030 | A | 6/1963 | Wunder |
| 3,099,870 | A | 8/1963 | Seeler |
| 3,128,327 | A | 4/1964 | Upton |
| 3,130,678 | A | 4/1964 | Chenault |
| 3,130,679 | A | 4/1964 | Sence |
| 3,151,565 | A | 10/1964 | Albertson et al. |
| 3,171,357 | A | 3/1965 | Egger |
| 3,172,850 | A | 3/1965 | Englesberg et al. |
| 3,203,182 | A | 8/1965 | Pohl |
| 3,227,547 | A | 1/1966 | Szekely |
| 3,244,109 | A | 4/1966 | Barske |
| 3,251,676 | A | 5/1966 | Johnson |
| 3,255,702 | A | 6/1966 | Gehrm |
| 3,258,283 | A | 6/1966 | Winberg et al. |
| 3,272,619 | A | 9/1966 | Sweeney et al. |
| 3,289,473 | A | 12/1966 | Louda |
| 3,291,473 | A | 12/1966 | Sweeney et al. |
| 3,368,805 | A | 2/1968 | Davey et al. |
| 3,374,943 | A | 3/1968 | Cervenka |
| 3,400,923 | A | 9/1968 | Howie et al. |
| 3,417,929 | A | 12/1968 | Secrest et al. |
| 3,432,336 | A | 3/1969 | Langrod et al. |
| 3,459,133 | A | 8/1969 | Scheffler |
| 3,459,346 | A | 8/1969 | Tinnes |
| 3,477,383 | A | 11/1969 | Rawson et al. |
| 3,487,805 | A | 1/1970 | Satterthwaite |
| 3,512,762 | A | 5/1970 | Umbricht |
| 3,512,788 | A | 5/1970 | Kilbane |
| 3,532,445 | A | 10/1970 | Scheffler et al. |
| 3,561,885 | A | 2/1971 | Lake |

(56) References Cited

U.S. PATENT DOCUMENTS 3,575,525 A 4/1971 Fox et al.
3,581,767 A 6/1971 Jackson
3,612,715 A 10/1971 Yedidiah
3,618,917 A 11/1971 Fredrikson et al.
3,620,716 A 11/1971 Hess
3,650,730 A 3/1972 Derham et al.
3,689,048 A 9/1972 Foulard et al.
3,715,112 A 2/1973 Carbonnel
3,732,032 A 5/1973 Daneel
3,737,304 A 6/1973 Blayden et al.
3,737,305 A 6/1973 Blayden et al.
3,743,263 A 7/1973 Szekely
3,743,500 A 7/1973 Foulard et al.
3,753,690 A 8/1973 Emley et al.
3,759,628 A 9/1973 Kempf
3,759,635 A 9/1973 Carter et al.
3,767,382 A 10/1973 Bruno et al.
3,776,660 A 12/1973 Anderson et al.
3,785,632 A 1/1974 Kraemer et al.
3,787,143 A 1/1974 Carbonnel et al.
3,799,522 A 3/1974 Brant et al.
3,799,523 A 3/1974 Seki
3,807,708 A 4/1974 Jones
3,814,400 A 6/1974 Seki
3,824,028 A 7/1974 Zenkner et al.
3,824,042 A 7/1974 Barnes et al.
3,836,280 A 9/1974 Koch
3,839,019 A 10/1974 Bruno et al.
3,844,972 A 10/1974 Tully, Jr. et al.
3,871,872 A 3/1975 Downing et al.
3,873,073 A 3/1975 Baum et al.
3,873,305 A 3/1975 Claxton et al.
3,881,039 A 4/1975 Baldieri et al.
3,886,992 A 6/1975 Maas et al.
3,915,594 A 10/1975 Nesseth
3,915,694 A 10/1975 Ando
3,935,003 A 1/1976 Steinke et al.
3,941,588 A 3/1976 Dremann
3,941,589 A 3/1976 Norman et al.
3,942,473 A 3/1976 Chodash
3,954,134 A 5/1976 Maas et al.
3,958,979 A 5/1976 Valdo
3,958,981 A 5/1976 Forberg et al.
3,961,778 A 6/1976 Carbonnel et al.
3,966,456 A 6/1976 Ellenbaum et al.
3,967,286 A 6/1976 Andersson et al.
3,972,709 A 8/1976 Chin et al.
3,973,871 A 8/1976 Hance
3,984,234 A 10/1976 Claxton et al.
3,985,000 A 10/1976 Hartz
3,997,336 A 12/1976 van Linden et al.
4,003,560 A 1/1977 Carbonnel
4,008,884 A 2/1977 Fitzpatrick et al.
4,018,598 A 4/1977 Markus
4,043,146 A 8/1977 Stegherr et al.
4,052,199 A 10/1977 Mangalick
4,055,390 A 10/1977 Young
4,063,849 A 12/1977 Modianos
4,068,965 A 1/1978 Lichti
4,073,606 A 2/1978 Eller
4,091,970 A 5/1978 Komiyama et al.
4,119,141 A 10/1978 Thut et al.
4,125,146 A 11/1978 Muller
4,126,360 A 11/1978 Miller et al.
4,128,415 A 12/1978 van Linden et al.
4,147,474 A 4/1979 Heimdal et al.
4,169,584 A 10/1979 Mangalick
4,191,486 A 3/1980 Pelton
4,213,742 A 7/1980 Henshaw
4,242,039 A 12/1980 Villard et al.
4,244,423 A 1/1981 Thut et al.
4,286,985 A 9/1981 van Linden et al.
4,305,214 A 12/1981 Hurst
4,322,245 A 3/1982 Claxton
4,338,062 A 7/1982 Neal
4,347,041 A 8/1982 Cooper
4,351,514 A 9/1982 Koch
4,355,789 A 10/1982 Dolzhenkov et al.
4,356,940 A 11/1982 Ansorge
4,360,314 A 11/1982 Pennell
4,370,096 A 1/1983 Church
4,372,541 A 2/1983 Bocourt et al.
4,375,937 A 3/1983 Cooper
4,389,159 A 6/1983 Sarvanne
4,392,888 A 7/1983 Eckert et al.
4,410,299 A 10/1983 Shimoyama
4,419,049 A 12/1983 Gerboth et al.
4,456,424 A 6/1984 Araoka
4,470,846 A 9/1984 Dube
4,474,315 A 10/1984 Gilbert et al.
4,496,393 A 1/1985 Lustenberger
4,504,392 A 3/1985 Groteke
4,509,979 A 4/1985 Bauer
4,537,624 A 8/1985 Tenhover et al.
4,537,625 A 8/1985 Tenhover et al.
4,545,887 A 10/1985 Amesen
4,556,419 A 12/1985 Otsuka et al.
4,557,766 A 12/1985 Tenhover et al.
4,586,845 A 5/1986 Morris
4,592,700 A 6/1986 Toguchi et al.
4,594,052 A 6/1986 Niskanen
4,596,510 A 6/1986 Arneth et al.
4,598,899 A 7/1986 Cooper
4,600,222 A 7/1986 Appling
4,607,825 A 8/1986 Briolle et al.
4,609,442 A 9/1986 Tenhover et al.
4,611,790 A 9/1986 Otsuka et al.
4,617,232 A 10/1986 Chandler et al.
4,634,105 A 1/1987 Withers et al.
4,640,666 A 2/1987 Sodergard
4,655,610 A 4/1987 Al-Jaroudi
4,669,953 A 6/1987 Gechwender
4,673,434 A 6/1987 Withers et al.
4,682,585 A 7/1987 Hiltebrandt
4,684,281 A 8/1987 Patterson
4,685,822 A 8/1987 Pelton
4,696,703 A 9/1987 Henderson et al.
4,701,226 A 10/1987 Henderson et al.
4,702,768 A 10/1987 Areauz et al.
4,714,371 A 12/1987 Cuse
4,717,540 A 1/1988 McRae et al.
4,739,974 A 4/1988 Mordue
4,741,664 A 5/1988 Olmstead
4,743,428 A 5/1988 McRae et al.
4,747,583 A 5/1988 Gordon et al.
4,767,230 A 8/1988 Leas, Jr.
4,770,701 A 9/1988 Henderson et al.
4,786,230 A 11/1988 Thut
4,802,656 A 2/1989 Hudault et al.
4,804,168 A 2/1989 Otsuka et al.
4,810,314 A 3/1989 Henderson et al.
4,822,473 A 4/1989 Arnesen
4,834,573 A 5/1989 Asano et al.
4,842,227 A 6/1989 Harrington et al.
4,844,425 A 7/1989 Piras et al.
4,851,296 A 7/1989 Tenhover et al.
4,859,413 A 8/1989 Harris et al.
4,860,819 A 8/1989 Moscoe et al.
4,867,638 A 9/1989 Handtmann et al.
4,884,786 A 12/1989 Gillespie
4,898,367 A 2/1990 Cooper
4,908,060 A 3/1990 Duenkelmann
4,911,726 A 3/1990 Warkentin
4,923,770 A 5/1990 Grasselli et al.
4,930,986 A 6/1990 Cooper
4,931,091 A 6/1990 Waite et al.
4,940,214 A 7/1990 Gillespie
4,940,384 A 7/1990 Amra et al.
4,954,167 A 9/1990 Cooper
4,967,827 A 11/1990 Campbell
4,973,433 A 11/1990 Gilbert et al.
4,986,736 A 1/1991 Kajiwara et al.
4,989,736 A 2/1991 Andersson et al.
5,015,518 A 5/1991 Sasaki et al.

(56) References Cited

U.S. PATENT DOCUMENTS

| | | | |
|---|---|---|---|
| 5,025,198 | A | 6/1991 | Mordue et al. |
| 5,028,211 | A | 7/1991 | Mordue et al. |
| 5,029,821 | A | 7/1991 | Bar-on et al. |
| 5,058,654 | A | 10/1991 | Simmons |
| 5,078,572 | A | 1/1992 | Amra et al. |
| 5,080,715 | A | 1/1992 | Provencher et al. |
| 5,083,753 | A | 1/1992 | Soofi |
| 5,088,893 | A | 2/1992 | Gilbert et al. |
| 5,092,821 | A | 3/1992 | Gilbert et al. |
| 5,098,134 | A | 3/1992 | Monckton |
| 5,099,554 | A | 3/1992 | Cooper |
| 5,114,312 | A | 5/1992 | Stanislao |
| 5,126,047 | A | 6/1992 | Martin et al. |
| 5,131,632 | A | 7/1992 | Olson |
| 5,135,202 | A | 8/1992 | Yamashita et al. |
| 5,143,357 | A | 9/1992 | Gilbert et al. |
| 5,145,322 | A | 9/1992 | Senior, Jr. et al. |
| 5,152,631 | A | 10/1992 | Bauer |
| 5,154,652 | A | 10/1992 | Ecklesdafer |
| 5,158,440 | A | 10/1992 | Cooper et al. |
| 5,162,858 | A | 11/1992 | Shoji et al. |
| 5,165,858 | A | 11/1992 | Gilbert et al. |
| 5,177,304 | A | 1/1993 | Nagel |
| 5,191,154 | A | 3/1993 | Nagel |
| 5,192,193 | A | 3/1993 | Cooper et al. |
| 5,202,100 | A | 4/1993 | Nagel et al. |
| 5,203,681 | A | 4/1993 | Cooper |
| 5,209,641 | A | 5/1993 | Hoglund et al. |
| 5,215,448 | A | 6/1993 | Cooper |
| 5,268,020 | A | 12/1993 | Claxton |
| 5,286,163 | A | 2/1994 | Amra et al. |
| 5,298,233 | A | 3/1994 | Nagel |
| 5,301,620 | A | 4/1994 | Nagel et al. |
| 5,303,903 | A | 4/1994 | Butler et al. |
| 5,308,045 | A | 5/1994 | Cooper |
| 5,310,412 | A | 5/1994 | Gilbert et al. |
| 5,318,360 | A | 6/1994 | Langer et al. |
| 5,322,547 | A | 6/1994 | Nagel et al. |
| 5,324,341 | A | 6/1994 | Nagel et al. |
| 5,330,328 | A | 7/1994 | Cooper |
| 5,354,940 | A | 10/1994 | Nagel |
| 5,358,549 | A | 10/1994 | Nagel et al. |
| 5,358,697 | A | 10/1994 | Nagel |
| 5,364,078 | A | 11/1994 | Pelton |
| 5,369,063 | A | 11/1994 | Gee et al. |
| 5,383,651 | A | 1/1995 | Blasen et al. |
| 5,388,633 | A | 2/1995 | Mercer, II et al. |
| 5,395,405 | A | 3/1995 | Nagel et al. |
| 5,399,074 | A | 3/1995 | Nose et al. |
| 5,407,294 | A | 4/1995 | Giannini |
| 5,411,240 | A | 5/1995 | Rapp et al. |
| 5,425,410 | A | 6/1995 | Reynolds |
| 5,431,551 | A | 7/1995 | Aquino et al. |
| 5,435,982 | A | 7/1995 | Wilkinson |
| 5,436,210 | A | 7/1995 | Wilkinson et al. |
| 5,443,572 | A | 8/1995 | Wilkinson et al. |
| 5,454,423 | A | 10/1995 | Tsuchida et al. |
| 5,468,280 | A | 11/1995 | Areaux |
| 5,470,201 | A | 11/1995 | Gilbert et al. |
| 5,484,265 | A | 1/1996 | Horvath et al. |
| 5,489,734 | A | 2/1996 | Nagel et al. |
| 5,491,279 | A | 2/1996 | Robert et al. |
| 5,494,382 | A | 2/1996 | Kloppers |
| 5,495,746 | A | 3/1996 | Sigworth |
| 5,505,143 | A | 4/1996 | Nagel |
| 5,505,435 | A | 4/1996 | Laszlo |
| 5,509,791 | A | 4/1996 | Turner |
| 5,511,766 | A | 4/1996 | Vassilicos |
| 5,520,422 | A | 5/1996 | Friedrich |
| 5,537,940 | A | 7/1996 | Nagel et al. |
| 5,543,558 | A | 8/1996 | Nagel et al. |
| 5,555,822 | A | 9/1996 | Loewen et al. |
| 5,558,501 | A | 9/1996 | Wang et al. |
| 5,558,505 | A | 9/1996 | Mordue et al. |
| 5,571,486 | A | 11/1996 | Robert et al. |
| 5,585,532 | A | 12/1996 | Nagel |
| 5,586,863 | A | 12/1996 | Gilbert et al. |
| 5,591,243 | A | 1/1997 | Colussi et al. |
| 5,597,289 | A | 1/1997 | Thut |
| 5,613,245 | A | 3/1997 | Robert |
| 5,616,167 | A | 4/1997 | Eckert |
| 5,622,481 | A | 4/1997 | Thut |
| 5,629,464 | A | 5/1997 | Bach et al. |
| 5,634,770 | A | 6/1997 | Gilbert et al. |
| 5,640,706 | A | 6/1997 | Nagel et al. |
| 5,640,707 | A | 6/1997 | Nagel et al. |
| 5,640,709 | A | 6/1997 | Nagel et al. |
| 5,655,849 | A | 8/1997 | McEwen et al. |
| 5,660,614 | A | 8/1997 | Waite et al. |
| 5,662,725 | A | 9/1997 | Cooper |
| 5,676,520 | A | 10/1997 | Thut |
| 5,678,244 | A | 10/1997 | Shaw et al. |
| 5,678,807 | A | 10/1997 | Cooper |
| 5,679,132 | A | 10/1997 | Rauenzahn et al. |
| 5,685,701 | A | 11/1997 | Chandler et al. |
| 5,690,888 | A | 11/1997 | Robert |
| 5,695,732 | A | 12/1997 | Sparks et al. |
| 5,716,195 | A | 2/1998 | Thut |
| 5,717,149 | A | 2/1998 | Nagel et al. |
| 5,718,416 | A | 2/1998 | Flisakowski et al. |
| 5,735,668 | A | 4/1998 | Klein |
| 5,735,935 | A | 4/1998 | Areaux |
| 5,741,422 | A | 4/1998 | Eichenmiller et al. |
| 5,744,093 | A | 4/1998 | Davis |
| 5,744,117 | A | 4/1998 | Wilkinson et al. |
| 5,745,861 | A | 4/1998 | Bell et al. |
| 5,755,847 | A | 5/1998 | Quayle |
| 5,758,712 | A | 6/1998 | Pederson |
| 5,772,324 | A | 6/1998 | Falk |
| 5,776,420 | A | 7/1998 | Nagel |
| 5,785,494 | A | 7/1998 | Vild et al. |
| 5,842,832 | A | 12/1998 | Thut |
| 5,846,481 | A | 12/1998 | Tilak |
| 5,858,059 | A | 1/1999 | Abramovich et al. |
| 5,863,314 | A | 1/1999 | Morando |
| 5,866,095 | A | 2/1999 | McGeever et al. |
| 5,875,385 | A | 2/1999 | Stephenson et al. |
| 5,935,528 | A | 8/1999 | Stephenson et al. |
| 5,944,496 | A | 8/1999 | Cooper |
| 5,947,705 | A | 9/1999 | Mordue et al. |
| 5,948,352 | A | 9/1999 | Jagt et al. |
| 5,951,243 | A | 9/1999 | Cooper |
| 5,961,285 | A | 10/1999 | Meneice et al. |
| 5,963,580 | A | 10/1999 | Eckert |
| 5,992,230 | A | 11/1999 | Scarpa et al. |
| 5,993,726 | A | 11/1999 | Huang |
| 5,993,728 | A | 11/1999 | Vild |
| 6,007,313 | A | 12/1999 | Siegel |
| 6,019,576 | A | 2/2000 | Thut |
| 6,027,685 | A | 2/2000 | Cooper |
| 6,036,745 | A | 3/2000 | Gilbert et al. |
| 6,074,455 | A | 6/2000 | van Linden et al. |
| 6,082,965 | A | 7/2000 | Morando |
| 6,093,000 | A | 7/2000 | Cooper |
| 6,096,109 | A | 8/2000 | Nagel et al. |
| 6,113,154 | A | 9/2000 | Thut |
| 6,123,523 | A | 9/2000 | Cooper |
| 6,152,691 | A | 11/2000 | Thut |
| 6,168,753 | B1 | 1/2001 | Morando |
| 6,187,096 | B1 | 2/2001 | Thut |
| 6,199,836 | B1 | 3/2001 | Rexford et al. |
| 6,217,823 | B1 | 4/2001 | Vild et al. |
| 6,231,639 | B1 | 5/2001 | Eichenmiller |
| 6,250,881 | B1 | 6/2001 | Mordue et al. |
| 6,254,340 | B1 | 7/2001 | Vild et al. |
| 6,270,717 | B1 | 8/2001 | Tremblay et al. |
| 6,280,157 | B1 | 8/2001 | Cooper |
| 6,293,759 | B1 | 9/2001 | Thut |
| 6,303,074 | B1 | 10/2001 | Cooper |
| 6,345,964 | B1 | 2/2002 | Cooper |
| 6,354,796 | B1 | 3/2002 | Morando |
| 6,358,467 | B1 | 3/2002 | Mordue |
| 6,364,930 | B1 | 4/2002 | Kos |
| 6,371,723 | B1 | 4/2002 | Grant et al. |

(56) References Cited

U.S. PATENT DOCUMENTS 6,398,525 B1 6/2002 Cooper
6,439,860 B1 8/2002 Greer
6,451,247 B1 9/2002 Mordue et al.
6,457,940 B1 10/2002 Lehman
6,457,950 B1 10/2002 Cooper et al.
6,464,458 B2 10/2002 Vild et al.
6,495,948 B1 12/2002 Garrett, III
6,497,559 B1 12/2002 Grant
6,500,228 B1 12/2002 Klingensmith et al.
6,503,292 B2 1/2003 Klingensmith et al.
6,524,066 B2 2/2003 Thut
6,533,535 B2 3/2003 Thut
6,551,060 B2 4/2003 Mordue et al.
6,562,286 B1 5/2003 Lehman
6,656,415 B2 12/2003 Kos
6,679,936 B2 1/2004 Quackenbush
6,689,310 B1 2/2004 Cooper
6,709,234 B2 3/2004 Gilbert et al.
6,716,147 B1 4/2004 Hinkle et al.
6,723,276 B1 4/2004 Cooper
6,805,834 B2 10/2004 Thut
6,843,640 B2 1/2005 Mordue et al.
6,848,497 B2 2/2005 Sale et al.
6,869,271 B2 3/2005 Gilbert et al.
6,869,564 B2 3/2005 Gilbert et al.
6,881,030 B2 4/2005 Thut
6,887,424 B2 5/2005 Ohno et al.
6,887,425 B2 5/2005 Mordue et al.
6,902,696 B2 6/2005 Klingensmith et al.
7,037,462 B2 5/2006 Klingensmith et al.
7,074,361 B2 7/2006 Carolla et al.
7,083,758 B2 8/2006 Tremblay
7,131,482 B2 11/2006 Vincent et al.
7,157,043 B2 1/2007 Neff
7,204,954 B2 4/2007 Mizuno
7,273,582 B2 9/2007 Mordue
7,279,128 B2 10/2007 Kennedy et al.
7,326,028 B2 2/2008 Morando
7,402,276 B2 7/2008 Cooper
7,470,392 B2 12/2008 Cooper
7,476,357 B2 1/2009 Thut
7,481,966 B2 1/2009 Mizuno
7,497,988 B2 3/2009 Thut
7,507,365 B2 3/2009 Thut
7,507,367 B2 3/2009 Cooper
7,543,605 B1 6/2009 Morando
7,731,891 B2 6/2010 Cooper
7,771,171 B2 8/2010 Mohr
7,841,379 B1 11/2010 Evans
7,896,617 B1 3/2011 Morando
7,906,068 B2 3/2011 Cooper
8,075,837 B2 12/2011 Cooper
8,110,141 B2 2/2012 Cooper
8,137,023 B2 3/2012 Greer
8,142,145 B2 3/2012 Thut
8,178,037 B2 5/2012 Cooper
8,328,540 B2 12/2012 Wang
8,333,921 B2 12/2012 Thut
8,337,746 B2 12/2012 Cooper
8,361,379 B2 1/2013 Cooper
8,366,993 B2 2/2013 Cooper
8,409,495 B2 4/2013 Cooper
8,440,135 B2 5/2013 Cooper
8,444,911 B2 5/2013 Cooper
8,449,814 B2 5/2013 Cooper
8,475,594 B2 7/2013 Bright et al.
8,475,708 B2 7/2013 Cooper
8,480,950 B2 7/2013 Jetten et al.
8,501,084 B2 8/2013 Cooper
8,524,146 B2 9/2013 Cooper
8,529,828 B2 9/2013 Cooper
8,535,603 B2 9/2013 Cooper
8,580,218 B2 11/2013 Turenne et al.
8,613,884 B2 12/2013 Cooper
8,714,914 B2 5/2014 Cooper
8,753,563 B2 6/2014 Cooper
8,840,359 B2 9/2014 Vick et al.
8,899,932 B2 12/2014 Tetkoskie et al.
8,915,830 B2 12/2014 March et al.
8,920,680 B2 12/2014 Mao
9,011,761 B2 4/2015 Cooper
9,017,597 B2 4/2015 Cooper
9,034,244 B2 5/2015 Cooper
9,057,376 B2 6/2015 Thut
9,057,377 B1 6/2015 Thut
9,074,601 B1 7/2015 Thut
9,080,577 B2 7/2015 Cooper
9,108,224 B2 8/2015 Schererz et al.
9,108,244 B2 8/2015 Cooper
9,156,087 B2 10/2015 Cooper
9,193,532 B2 11/2015 March et al.
9,205,490 B2 12/2015 Cooper
9,234,520 B2 1/2016 Morando
9,273,376 B2 3/2016 Lutes et al.
9,328,615 B2 5/2016 Cooper
9,377,028 B2 6/2016 Cooper
9,382,599 B2 7/2016 Cooper
9,383,140 B2 7/2016 Cooper
9,388,925 B2 7/2016 Juarez
9,409,232 B2 8/2016 Cooper
9,410,744 B2 8/2016 Cooper
9,422,942 B2 8/2016 Cooper
9,435,343 B2 9/2016 Cooper
9,464,636 B2 10/2016 Cooper
9,470,239 B2 10/2016 Cooper
9,476,644 B2 10/2016 Howitt et al.
9,481,035 B2 11/2016 Cooper
9,481,918 B2 11/2016 Vild et al.
9,482,469 B2 11/2016 Cooper
9,494,366 B1 11/2016 Thut
9,506,129 B2 11/2016 Cooper
9,506,346 B2 11/2016 Bright et al.
9,532,670 B2 1/2017 Vanessen
9,566,645 B2 2/2017 Cooper
9,581,388 B2 2/2017 Cooper
9,587,883 B2 3/2017 Cooper
9,632,670 B2 4/2017 Wu
9,643,247 B2 5/2017 Cooper
9,657,578 B2 5/2017 Cooper
9,855,600 B2 1/2018 Cooper
9,862,026 B2 1/2018 Cooper
9,903,383 B2 2/2018 Cooper
9,909,808 B2 3/2018 Cooper
9,920,767 B2 3/2018 Klain et al.
9,925,587 B2 3/2018 Cooper
9,951,777 B2 4/2018 Morando et al.
9,970,442 B2 5/2018 Tipton
9,982,945 B2 5/2018 Cooper
10,052,688 B2 8/2018 Cooper
10,072,897 B2 9/2018 Cooper
10,126,058 B2 11/2018 Cooper
10,126,059 B2 11/2018 Cooper
10,138,892 B2 11/2018 Cooper
10,195,664 B2 2/2019 Cooper et al.
10,267,314 B2 4/2019 Cooper
10,274,256 B2 4/2019 Cooper
10,302,361 B2 5/2019 Cooper
10,307,821 B2 6/2019 Cooper
10,309,725 B2 6/2019 Cooper
10,322,451 B2 6/2019 Cooper
10,345,045 B2 7/2019 Cooper
10,352,620 B2 7/2019 Cooper
10,428,821 B2 10/2019 Cooper
10,458,708 B2 10/2019 Cooper
10,465,688 B2 11/2019 Cooper
10,562,097 B2 2/2020 Cooper
10,570,745 B2 2/2020 Cooper
10,641,270 B2 5/2020 Cooper
10,641,279 B2 5/2020 Cooper
10,675,679 B2 6/2020 Cooper
11,020,798 B2 6/2021 Cooper
11,098,719 B2 8/2021 Cooper
11,098,720 B2 8/2021 Cooper
11,103,920 B2 8/2021 Cooper

(56) References Cited

U.S. PATENT DOCUMENTS

| | | | |
|---|---|---|---|
| 11,130,173 | B2 | 9/2021 | Cooper |
| 11,149,747 | B2 | 10/2021 | Cooper |
| 11,167,345 | B2 | 11/2021 | Cooper |
| 11,185,916 | B2 | 11/2021 | Cooper |
| 11,286,939 | B2 | 3/2022 | Cooper |
| 11,358,216 | B2 | 6/2022 | Cooper |
| 11,358,217 | B2 | 6/2022 | Cooper |
| 11,391,293 | B2 | 7/2022 | Cooper |
| 11,471,938 | B2 | 10/2022 | Fontana |
| 11,519,414 | B2 | 12/2022 | Cooper |
| 2001/0000465 | A1 | 4/2001 | Thut |
| 2002/0089099 | A1 | 7/2002 | Denning |
| 2002/0102159 | A1 | 8/2002 | Thut |
| 2002/0146313 | A1 | 10/2002 | Thut |
| 2002/0185790 | A1 | 12/2002 | Kilgensmith |
| 2002/0185794 | A1 | 12/2002 | Vincent |
| 2003/0047850 | A1 | 3/2003 | Areaux |
| 2003/0075844 | A1 | 4/2003 | Mordue et al. |
| 2003/0082052 | A1 | 5/2003 | Gilbert et al. |
| 2003/0151176 | A1 | 8/2003 | Ohno |
| 2003/0201583 | A1 | 10/2003 | Klingensmith |
| 2004/0050525 | A1 | 3/2004 | Kennedy et al. |
| 2004/0076533 | A1 | 4/2004 | Cooper |
| 2004/0096330 | A1 | 5/2004 | Gilbert |
| 2004/0115079 | A1 | 6/2004 | Cooper |
| 2004/0245684 | A1 | 12/2004 | Kojo |
| 2004/0262825 | A1 | 12/2004 | Cooper |
| 2005/0013713 | A1 | 1/2005 | Cooper |
| 2005/0013714 | A1 | 1/2005 | Cooper |
| 2005/0013715 | A1 | 1/2005 | Cooper |
| 2005/0053499 | A1 | 3/2005 | Cooper |
| 2005/0077730 | A1 | 4/2005 | Thut |
| 2005/0081607 | A1 | 4/2005 | Patel et al. |
| 2005/0116398 | A1 | 6/2005 | Tremblay |
| 2006/0180963 | A1 | 8/2006 | Thut |
| 2007/0253807 | A1 | 11/2007 | Cooper |
| 2008/0163999 | A1 | 7/2008 | Hymas et al. |
| 2008/0202644 | A1 | 8/2008 | Grassi |
| 2008/0211147 | A1 | 9/2008 | Cooper |
| 2008/0213111 | A1 | 9/2008 | Cooper |
| 2008/0230966 | A1 | 9/2008 | Cooper |
| 2008/0253905 | A1 | 10/2008 | Morando et al. |
| 2008/0304970 | A1 | 12/2008 | Cooper |
| 2008/0314548 | A1 | 12/2008 | Cooper |
| 2009/0054167 | A1 | 2/2009 | Cooper |
| 2009/0140013 | A1 | 6/2009 | Cooper |
| 2009/0269191 | A1 | 10/2009 | Cooper |
| 2010/0104415 | A1 | 4/2010 | Morando |
| 2010/0200354 | A1 | 8/2010 | Yagi et al. |
| 2011/0133374 | A1 | 6/2011 | Cooper |
| 2011/0140318 | A1 | 6/2011 | Reeves et al. |
| 2011/0140319 | A1 | 6/2011 | Cooper |
| 2011/0140619 | A1 | 6/2011 | Lin |
| 2011/0142603 | A1 | 6/2011 | Cooper |
| 2011/0142606 | A1 | 6/2011 | Cooper |
| 2011/0148012 | A1 | 6/2011 | Cooper |
| 2011/0163486 | A1 | 7/2011 | Cooper |
| 2011/0210232 | A1 | 9/2011 | Cooper |
| 2011/0220771 | A1 | 9/2011 | Cooper |
| 2011/0227338 | A1 | 9/2011 | Pollack |
| 2011/0303706 | A1 | 12/2011 | Cooper |
| 2012/0003099 | A1 | 1/2012 | Tetkoskie |
| 2012/0163959 | A1 | 6/2012 | Morando |
| 2013/0105102 | A1 | 5/2013 | Cooper |
| 2013/0142625 | A1 | 6/2013 | Cooper |
| 2013/0214014 | A1 | 8/2013 | Cooper |
| 2013/0224038 | A1 | 8/2013 | Tetkoskie et al. |
| 2013/0292426 | A1* | 11/2013 | Cooper ............... C22B 21/0084 222/590 |
| 2013/0292427 | A1 | 11/2013 | Cooper |
| 2013/0299524 | A1 | 11/2013 | Cooper |
| 2013/0299525 | A1 | 11/2013 | Cooper |
| 2013/0306687 | A1 | 11/2013 | Cooper |
| 2013/0334744 | A1 | 12/2013 | Tremblay |
| 2013/0343904 | A1 | 12/2013 | Cooper |
| 2014/0008849 | A1 | 1/2014 | Cooper |
| 2014/0041252 | A1 | 2/2014 | Vild et al. |
| 2014/0044520 | A1 | 2/2014 | Tipton |
| 2014/0083253 | A1 | 3/2014 | Lutes et al. |
| 2014/0210144 | A1 | 7/2014 | Torres et al. |
| 2014/0232048 | A1 | 8/2014 | Howitt et al. |
| 2014/0252697 | A1 | 9/2014 | Rauch |
| 2014/0252701 | A1 | 9/2014 | Cooper |
| 2014/0261800 | A1 | 9/2014 | Cooper |
| 2014/0263482 | A1 | 9/2014 | Cooper |
| 2014/0265068 | A1 | 9/2014 | Cooper |
| 2014/0271219 | A1 | 9/2014 | Cooper |
| 2014/0363309 | A1 | 12/2014 | Henderson et al. |
| 2015/0069679 | A1 | 3/2015 | Henderson et al. |
| 2015/0184311 | A1 | 7/2015 | Turenne |
| 2015/0192364 | A1 | 7/2015 | Cooper |
| 2015/0217369 | A1 | 8/2015 | Cooper |
| 2015/0219111 | A1 | 8/2015 | Cooper |
| 2015/0219112 | A1 | 8/2015 | Cooper |
| 2015/0219113 | A1 | 8/2015 | Cooper |
| 2015/0219114 | A1 | 8/2015 | Cooper |
| 2015/0224574 | A1 | 8/2015 | Cooper |
| 2015/0252807 | A1 | 9/2015 | Cooper |
| 2015/0285557 | A1 | 10/2015 | Cooper |
| 2015/0285558 | A1 | 10/2015 | Cooper |
| 2015/0323256 | A1 | 11/2015 | Cooper |
| 2015/0328682 | A1 | 11/2015 | Cooper |
| 2015/0328683 | A1 | 11/2015 | Cooper |
| 2016/0031007 | A1 | 2/2016 | Cooper |
| 2016/0040265 | A1 | 2/2016 | Cooper |
| 2016/0047602 | A1 | 2/2016 | Cooper |
| 2016/0053762 | A1 | 2/2016 | Cooper |
| 2016/0053814 | A1 | 2/2016 | Cooper |
| 2016/0082507 | A1 | 3/2016 | Cooper |
| 2016/0089718 | A1 | 3/2016 | Cooper |
| 2016/0091251 | A1 | 3/2016 | Cooper |
| 2016/0116216 | A1 | 4/2016 | Schlicht et al. |
| 2016/0221855 | A1 | 8/2016 | Retorick et al. |
| 2016/0250686 | A1 | 9/2016 | Cooper |
| 2016/0265535 | A1 | 9/2016 | Cooper |
| 2016/0305711 | A1 | 10/2016 | Cooper |
| 2016/0320129 | A1 | 11/2016 | Cooper |
| 2016/0320130 | A1 | 11/2016 | Cooper |
| 2016/0320131 | A1 | 11/2016 | Cooper |
| 2016/0346836 | A1 | 12/2016 | Henderson et al. |
| 2016/0348973 | A1 | 12/2016 | Cooper |
| 2016/0348974 | A1 | 12/2016 | Cooper |
| 2016/0348975 | A1 | 12/2016 | Cooper |
| 2017/0037852 | A1 | 2/2017 | Bright et al. |
| 2017/0038146 | A1 | 2/2017 | Cooper |
| 2017/0045298 | A1 | 2/2017 | Cooper |
| 2017/0056973 | A1 | 3/2017 | Tremblay et al. |
| 2017/0082368 | A1 | 3/2017 | Cooper |
| 2017/0106435 | A1 | 4/2017 | Vincent |
| 2017/0106441 | A1 | 4/2017 | Vincent |
| 2017/0130298 | A1 | 5/2017 | Teranishi et al. |
| 2017/0167793 | A1 | 6/2017 | Cooper et al. |
| 2017/0198721 | A1 | 7/2017 | Cooper |
| 2017/0219289 | A1 | 8/2017 | Williams et al. |
| 2017/0241713 | A1 | 8/2017 | Henderson et al. |
| 2017/0246681 | A1 | 8/2017 | Tipton et al. |
| 2017/0276430 | A1 | 9/2017 | Cooper |
| 2018/0058465 | A1 | 3/2018 | Cooper |
| 2018/0111189 | A1 | 4/2018 | Cooper |
| 2018/0178281 | A1 | 6/2018 | Cooper |
| 2018/0195513 | A1 | 7/2018 | Cooper |
| 2018/0311726 | A1 | 11/2018 | Cooper |
| 2019/0032675 | A1 | 1/2019 | Cooper |
| 2019/0270134 | A1 | 9/2019 | Cooper |
| 2019/0293089 | A1 | 9/2019 | Cooper |
| 2019/0351481 | A1 | 11/2019 | Tetkoskie |
| 2019/0360491 | A1 | 11/2019 | Cooper |
| 2019/0360492 | A1 | 11/2019 | Cooper |
| 2019/0368494 | A1 | 12/2019 | Cooper |
| 2020/0130050 | A1 | 4/2020 | Cooper |
| 2020/0130051 | A1 | 4/2020 | Cooper |
| 2020/0130052 | A1 | 4/2020 | Cooper |
| 2020/0130053 | A1 | 4/2020 | Cooper |
| 2020/0130054 | A1 | 4/2020 | Cooper |

(56) References Cited

U.S. PATENT DOCUMENTS

| | | | | |
|---|---|---|---|---|
| 2020/0182247 | A1 | 6/2020 | Cooper | |
| 2020/0182248 | A1 | 6/2020 | Cooper | |
| 2020/0256350 | A1 | 8/2020 | Cooper | |
| 2020/0360987 | A1 | 11/2020 | Cooper | |
| 2020/0360988 | A1 | 11/2020 | Fontana | |
| 2020/0360989 | A1 | 11/2020 | Cooper | |
| 2020/0360990 | A1 | 11/2020 | Cooper | |
| 2020/0362865 | A1 | 11/2020 | Cooper | |
| 2020/0363128 | A1 | 11/2020 | Cooper | |
| 2021/0199115 | A1 | 7/2021 | Cooper | |
| 2021/0254622 | A1 | 8/2021 | Cooper | |
| 2022/0025905 | A1 | 1/2022 | Cooper | |
| 2022/0080498 | A1 | 3/2022 | Cooper | |
| 2022/0193764 | A1 | 6/2022 | Cooper | |
| 2022/0213895 | A1 | 7/2022 | Cooper | |
| 2022/0234099 | A1 | 7/2022 | Cooper | |
| 2022/0381246 | A1 | 12/2022 | Cooper | |
| 2023/0001474 | A1 | 1/2023 | Cooper | |
| 2023/0219132 | A1* | 7/2023 | Cooper | B22D 39/02 222/594 |

FOREIGN PATENT DOCUMENTS

| | | | |
|---|---|---|---|
| CA | 2244251 | | 6/1998 |
| CA | 2305865 | | 2/2000 |
| CA | 2176475 | | 7/2005 |
| CA | 2924572 | | 4/2015 |
| CH | 392268 | | 9/1965 |
| CN | 102943761 | | 2/2013 |
| CN | 103511331 | | 1/2014 |
| DE | 1800446 | | 12/1969 |
| DE | 19541093 | | 5/1997 |
| DE | 19614350 | | 10/1997 |
| DE | 102006051814 | | 7/2008 |
| EP | 168250 | | 1/1986 |
| EP | 665378 | | 8/1995 |
| EP | 1019635 | | 6/2006 |
| GB | 543607 | | 3/1942 |
| GB | 942648 | | 11/1963 |
| GB | 1185314 | | 3/1970 |
| GB | 1565911 | | 4/1980 |
| GB | 1575991 | | 10/1980 |
| GB | 212260 | | 1/1984 |
| GB | 2193257 | | 2/1988 |
| GB | 2217784 | | 3/1989 |
| GB | 2289919 | | 12/1995 |
| JP | 58048796 | | 3/1983 |
| JP | 63104773 | | 5/1988 |
| JP | 11-270799 | | 10/1999 |
| JP | 5112837 | | 1/2013 |
| MX | 227385 | | 4/2005 |
| NO | 90756 | | 1/1959 |
| SU | 416401 | | 2/1974 |
| SU | 773312 | | 10/1980 |
| WO | 199808990 | | 3/1998 |
| WO | 199825031 | | 6/1998 |
| WO | 200009889 | A1 | 2/2000 |
| WO | 200091159 | | 2/2000 |
| WO | 2002012147 | | 2/2002 |
| WO | 2004029307 | | 4/2004 |
| WO | 2010147932 | | 12/2010 |
| WO | 2014031484 | | 2/2014 |
| WO | 2014055082 | | 4/2014 |
| WO | 2014150503 | | 9/2014 |
| WO | 2014185971 | | 11/2014 |

OTHER PUBLICATIONS

Document No. 504217: Excerpts from “Pyrotek Inc.’s Motion for Summary Judgment of Invalidity and Unenforceability of U.S. Pat. No. 7,402,276,” Oct. 2, 2009.

Document No. 505026: Excerpts from “MMEI’s Response to Pyrotek’s Motion for Summary Judgment of Invalidity or Enforceability of U.S. Pat. No. 7,402,276,” Oct. 9, 2009.

Document No. 507689: Excerpts from “MMEI’s Pre-Hearing Brief and Supplemental Motion for Summary Judgment of Infringement of Claims 3, 4, 15, 17-20, 26, 28 and 29 of the ’074 Patent and Motion for Reconsideration of the Validity of Claims 7-9 of the ’276 Patent,” Nov. 4, 2009.

Document No. 517158: Excerpts from “Reasoned Award,” Feb. 19, 2010.

Document No. 525055: Excerpts from “Molten Metal Equipment Innovations, Inc.’s Reply Brief in Support of Application to Confirm Arbitration Award and Opposition to Motion to Vacate,” May 12, 2010.

USPTO; Notice of Reissue Examination Certificate dated Aug. 27, 2001 in U.S. Appl. No. 90/005,910.

* cited by examiner

SECTION A-A

SECTION B-B

SECTION C-C

MOLTEN METAL TRANSFER SYSTEM AND METHOD

CROSS REFERENCE TO RELATED APPLICATIONS

This application is a continuation of, claims priority to, and incorporates by reference, U.S. patent application Ser. No. 16/877,364 filed May 18, 2020 and entitled "MOLTEN METAL TRANSFER SYSTEM AND METHOD which claims priority to and incorporates by reference: (1) U.S. Provisional Patent Application Ser. No. 62/849,787 filed May 17, 2019 and entitled MOLTEN METAL PUMPS, COMPONENTS, SYSTEMS AND METHODS, and (2) U.S. Provisional Patent Application Ser. No. 62/852,846 filed May 24, 2019 and entitled SMART MOLTEN METAL PUMP.

BACKGROUND OF THE INVENTION

As used herein, the term "molten metal" means any metal or combination of metals in liquid form, such as aluminum, copper, iron, zinc and alloys thereof. The term "gas" means any gas or combination of gases, including argon, nitrogen, chlorine, fluorine, Freon, and helium, which are released into molten metal.

Known molten-metal pumps include a pump base (also called a housing or casing), one or more inlets (an inlet being an opening in the housing to allow molten metal to enter a pump chamber), a pump chamber of any suitable configuration, which is an open area formed within the housing, and a discharge, which is a channel or conduit of any structure or type communicating with the pump chamber (in an axial pump the chamber and discharge may be the same structure or different areas of the same structure) leading from the pump chamber to an outlet, which is an opening formed in the exterior of the housing through which molten metal exits the casing. An impeller, also called a rotor, is mounted in the pump chamber and is connected to a drive system. The drive shaft is typically an impeller shaft connected to one end of a motor shaft, the other end of the drive shaft being connected to an impeller. Often, the impeller (or rotor) shaft is comprised of graphite and/or ceramic, the motor shaft is comprised of steel, and the two are connected by a coupling. As the motor turns the drive shaft, the drive shaft turns the impeller and the impeller pushes molten metal out of the pump chamber, through the discharge, out of the outlet and into the molten metal bath. Most molten metal pumps are gravity fed, wherein gravity forces molten metal through the inlet and into the pump chamber as the impeller pushes molten metal out of the pump chamber. Other molten metal pumps do not include a base or support posts and are sized to fit into a structure by which molten metal is pumped. Most pumps have a metal platform, or super structure, that is either supported by a plurality of support posts attached to the pump base, or unsupported if there is no base. The motor is positioned on the superstructure, if a superstructure is used.

This application incorporates by reference the portions of the following documents that are not inconsistent with this disclosure: U.S. Pat. No. 4,598,899, issued Jul. 8, 1986, to Paul V. Cooper, U.S. Pat. No. 5,203,681, issued Apr. 20, 1993, to Paul V. Cooper, U.S. Pat. No. 5,308,045, issued May 3, 1994, by Paul V. Cooper, U.S. Pat. No. 5,662,725, issued Sep. 2, 1997, by Paul V. Cooper, U.S. Pat. No. 5,678,807, issued Oct. 21, 1997, by Paul V. Cooper, U.S. Pat. No. 6,027,685, issued Feb. 22, 2000, by Paul V. Cooper, U.S.

Pat. No. 6,124,523, issued Sep. 26, 2000, by Paul V. Cooper, U.S. Pat. No. 6,303,074, issued Oct. 16, 2001, by Paul V. Cooper, U.S. Pat. No. 6,689,310, issued Feb. 10, 2004, by Paul V. Cooper, U.S. Pat. No. 6,723,276, issued Apr. 20, 2004, by Paul V. Cooper, U.S. Pat. No. 7,402,276, issued Jul. 22, 2008, by Paul V. Cooper, U.S. Pat. No. 7,507,367, issued Mar. 24, 2009, by Paul V. Cooper, U.S. Pat. No. 7,906,068, issued Mar. 15, 2011, by Paul V. Cooper, U.S. Pat. No. 8,075,837, issued Dec. 13, 2011, by Paul V. Cooper, U.S. Pat. No. 8,110,141, issued Feb. 7, 2012, by Paul V. Cooper, U.S. Pat. No. 8,178,037, issued May 15, 2012, by Paul V. Cooper, U.S. Pat. No. 8,361,379, issued Jan. 29, 2013, by Paul V. Cooper, U.S. Pat. No. 8,366,993, issued Feb. 5, 2013, by Paul V. Cooper, U.S. Pat. No. 8,409,495, issued Apr. 2, 2013, by Paul V. Cooper, U.S. Pat. No. 8,440,135, issued May 15, 2013, by Paul V. Cooper, U.S. Pat. No. 8,444,911, issued May 21, 2013, by Paul V. Cooper, U.S. Pat. No. 8,475,708, issued Jul. 2, 2013, by Paul V. Cooper, U.S. patent application Ser. No. 12/895,796, filed Sep. 30, 2010, by Paul V. Cooper, U.S. patent application Ser. No. 12/877,988, filed Sep. 8, 2010, by Paul V. Cooper, U.S. patent application Ser. No. 12/853,238, filed Aug. 9, 2010, by Paul V. Cooper, U.S. patent application Ser. No. 12/880,027, filed Sep. 10, 2010, by Paul V. Cooper, U.S. patent application Ser. No. 13/752,312, filed Jan. 28, 2013, by Paul V. Cooper, U.S. patent application Ser. No. 13/756,468, filed Jan. 31, 2013, by Paul V. Cooper, U.S. patent application Ser. No. 13/791,889, filed Mar. 8, 2013, by Paul V. Cooper, U.S. patent application Ser. No. 13/791,952, filed Mar. 9, 2013, by Paul V. Cooper, U.S. patent application Ser. No. 13/841,594, filed Mar. 15, 2013, by Paul V. Cooper, and U.S. patent application Ser. No. 14/027,237, filed Sep. 15, 2013, by Paul V. Cooper, U.S. Pat. No. 8,535,603 entitled ROTARY DEGASSER AND ROTOR THEREFOR, U.S. Pat. No. 8,613,884 entitled LAUNDER TRANSFER INSERT AND SYSTEM, U.S. Pat. No. 8,714,914 entitled MOLTEN METAL PUMP FILTER, U.S. Pat. No. 8,753,563 entitled SYSTEM AND METHOD FOR DEGASSING MOLTEN METAL, U.S. Pat. No. 9,011,761 entitled LADLE WITH TRANSFER CONDUIT, U.S. Pat. No. 9,017,597 entitled TRANSFERRING MOLTEN METAL USING NON-GRAVITY ASSIST LAUNDER, U.S. Pat. No. 9,034,244 entitled GAS-TRANSFER FOOT, U.S. Pat. No. 9,080,577 entitled SHAFT AND POST TENSIONING DEVICE, U.S. Pat. No. 9,108,244 entitled IMMERSION HEATHER FOR MOLTEN METAL, U.S. Pat. No. 9,156,087 entitled MOLTEN METAL TRANSFER SYSTEM AND ROTOR, U.S. Pat. No. 9,205,490 entitled TRANSFER WELL SYSTEM AND METHOD FOR MAKING SAME, U.S. Pat. No. 9,328,615 entitled ROTARY DEGASSERS AND COMPONENTS THEREFOR, U.S. Pat. No. 9,377,028 entitled TENSIONING DEVICE EXTENDING BEYOND COMPONENT, U.S. Pat. No. 9,382,599 entitled ROTARY DEGASSER AND ROTOR THEREFOR, U.S. Pat. No. 9,383,140 entitled TRANSFERRING MOLTEN METAL FROM ONE STRUCTURE TO ANOTHER, U.S. Pat. No. 9,409,232 entitled MOLTEN METAL TRANSFER VESSEL AND METHOD OF CONSTRUCTION, U.S. Pat. No. 9,410,744 entitled VESSEL TRANSFER INSERT AND SYSTEM, U.S. Pat. No. 9,422,942 entitled TENSION DEVICE WITH INTERNAL PASSAGE, U.S. Pat. No. 9,435,343 entitled GAS-TRANSFER FOOT, U.S. Pat. No. 9,464,636 entitled TENSION DEVICE GRAPHITE COMPONENT USED IN MOLTEN METAL, U.S. Pat. No. 9,470,239 THREADED TENSIONING DEVICE, U.S. Pat. No. 9,481,035 entitled IMMERSION HEATER FOR MOLTEN METAL, U.S. Pat. No. 9,482,469 entitled VESSEL TRANSFER INSERT AND SYSTEM, U.S. Pat. No. 9,506,129 entitled ROTARY DEGASSER AND ROTOR THEREFOR, U.S. Pat. No. 9,566,645 entitled MOLTEN METAL TRANSFER SYSTEM AND ROTOR, U.S. Pat. No. 9,581,388 entitled VESSEL TRANSFER INSERT AND SYSTEM, U.S. Pat. No. 9,587,883 entitled LADLE WITH TRANSFER CONDUIT, U.S. Pat. No. 9,643,247 entitled MOLTEN METAL TRANSFER AND DEGASSING SYSTEM, U.S. Pat. No. 9,657,578 entitled ROTARY DEGASSERS AND COMPONENTS THEREFOR, U.S. Pat. No. 9,855,600 entitled MOLTEN METAL TRANSFER SYSTEM AND ROTOR, U.S. Pat. No. 9,862,026 entitled METHOD OF FORMING TRANSFER WELL, U.S. Pat. No. 9,903,383 entitled MOLTEN METAL ROTOR WITH HARDENED TOP, U.S. Pat. No. 9,909,808 entitled SYSTEM AND METHOD FOR DEGASSING MOLTEN METAL, U.S. Pat. No. 9,925,587 entitled METHOD OF TRANSFERRING MOLTEN METAL FROM A VESSEL, entitled U.S. Pat. No. 9,982,945 MOLTEN METAL TRANSFER VESSEL AND METHOD OF CONSTRUCTION, U.S. Pat. No. 10,052,688 entitled TRANSFER PUMP LAUNDER SYSTEM, U.S. Pat. No. 10,072,891 entitled TRANSFERRING MOLTEN METAL USING NON-GRAVITY ASSIST LAUNDER, U.S. Pat. No. 10,126,058 entitled MOLTEN METAL TRANSFERRING VESSEL, U.S. Pat. No. 10,126,059 entitled CONTROLLED MOLTEN METAL FLOW FROM TRANSFER VESSEL, U.S. Pat. No. 10,138,892 entitled ROTOR AND ROTOR SHAFT FOR MOLTEN METAL, U.S. Pat. No. 10,195,664 entitled MULTI-STAGE IMPELLER FOR MOLTEN METAL, U.S. Pat. No. 10,267,314 entitled TENSIONED SUPPORT SHAFT AND OTHER MOLTEN METAL DEVICES, U.S. Pat. No. 10,274,256 entitled VESSEL TRANSFER SYSTEMS AND DEVICES, U.S. Pat. No. 10,302,361 entitled TRANSFER VESSEL FOR MOLTEN METAL PUMPING DEVICE, U.S. Pat. No. 10,309,725 entitled IMMERSION HEATER FOR MOLTEN METAL, U.S. Pat. No. 10,307,821 entitled TRANSFER PUMP LAUNDER SYSTEM, 10,322,451 entitled TRANSFER PUMP LAUNDER SYSTEM, U.S. Pat. No. 10,345,045 entitled VESSEL TRANSFER INSERT AND SYSTEM, U.S. Pat. No. 10,352,620 entitled TRANSFERRING MOLTEN METAL FROM ONE STRUCTURE TO ANOTHER, U.S. Pat. No. 10,428,821 entitled QUICK SUBMERGENCE MOLTEN METAL PUMP, U.S. Pat. No. 10,458,708 entitled TRANSFERRING MOLTEN METAL FROM ONE STRUCTURE TO ANOTHER, U.S. Pat. No. 10,465,688 entitled COUPLING AND ROTOR SHAFT FOR MOLTEN METAL DEVICES, U.S. Pat. No. 10,562,097 entitled MOLTEN METAL TRANSFER SYSTEM AND ROTOR, U.S. Pat. No. 10,570,745 entitled ROTARY DEGASSERS AND COMPONENTS THEREFOR, U.S. Pat. No. 10,641,279 entitled MOLTEN METAL ROTOR WITH HARDENED TIP, U.S. Pat. No. 10,641,270 entitled TENSIONED SUPPORT SHAFT AND OTHER MOLTEN METAL DEVICES, and U.S. patent application Ser. Nos. 16/877,267, 16/877,296, 16/877,332, 16/877,182, 16/877,219, entitled MOLTEN METAL CONTROLLED FLOW LAUNDER, SYSTEM AND METHOD TO FEED MOLD WITH MOLTEN METAL, SMART MOLTEN METAL PUMP, SYSTEM FOR MELTING SOLID METAL, and METHOD FOR MELTING SOLID METAL, all of which were filed on the same date as this Application.

Three basic types of pumps for pumping molten metal, such as molten aluminum, are utilized: circulation pumps, transfer pumps and gas-release pumps. Circulation pumps are used to circulate the molten metal within a bath, thereby generally equalizing the temperature of the molten metal. Circulation pumps may be used in any vessel, such as in a reverbatory furnace having an external well. The well is usually an extension of the charging well, in which scrap metal is charged (i.e., added).

Standard transfer pumps are generally used to transfer molten metal from one structure to another structure such as a ladle or another furnace. A standard transfer pump has a riser tube connected to a pump discharge and supported by the superstructure. As molten metal is pumped it is pushed up the riser tube (sometimes called a metal-transfer conduit) and out of the riser tube, which generally has an elbow at its upper end, so molten metal is released into a different vessel from which the pump is positioned.

Gas-release pumps, such as gas-injection pumps, circulate molten metal while introducing a gas into the molten metal. In the purification of molten metals, particularly aluminum, it is frequently desired to remove dissolved gases such as hydrogen, or dissolved metals, such as magnesium. As is known by those skilled in the art, the removing of dissolved gas is known as "degassing" while the removal of magnesium is known as "demagging." Gas-release pumps may be used for either of both of these purposes or for any other application for which it is desirable to introduce gas into molten metal.

Gas-release pumps generally include a gas-transfer conduit having a first end that is connected to a gas source and a second end submerged in the molten metal bath. Gas is introduced into the first end and is released from the second end into the molten metal. The gas may be released downstream of the pump chamber into either the pump discharge or a metal-transfer conduit extending from the discharge, or into a stream of molten metal exiting either the discharge or the metal-transfer conduit. Alternatively, gas may be released into the pump chamber or upstream of the pump chamber at a position where molten metal enters the pump chamber. The gas may also be released into any suitable location in a molten metal bath.

Molten metal pump casings and rotors often employ a bearing system comprising ceramic rings wherein there are one or more rings on the rotor that align with rings in the pump chamber (such as rings at the inlet and outlet) when the rotor is placed in the pump chamber. The purpose of the bearing system is to reduce damage to the soft, graphite components, particularly the rotor and pump base, during pump operation.

Generally, a degasser (also called a rotary degasser) includes (1) an impeller shaft having a first end, a second end and a passage for transferring gas, (2) an impeller, and (3) a drive source for rotating the impeller shaft and the impeller. The first end of the impeller shaft is connected to the drive source and to a gas source and the second end is connected to the impeller.

Generally a scrap melter includes an impeller affixed to an end of a drive shaft, and a drive source attached to the other end of the drive shaft for rotating the shaft and the impeller. The movement of the impeller draws molten metal and scrap metal downward into the molten metal bath in order to melt the scrap. A circulation pump is preferably used in conjunction with the scrap melter to circulate the molten metal in order to maintain a relatively constant temperature within the molten metal.

The materials forming the components that contact the molten metal bath should remain relatively stable in the bath. Structural refractory materials, such as graphite or ceramics, that are resistant to disintegration by corrosive attack from the molten metal may be used. As used herein "ceramics" or "ceramic" refers to any oxidized metal (including silicon) or carbon-based material, excluding graphite, or other ceramic material capable of being used in the environment of a molten metal bath. "Graphite" means any type of graphite, whether or not chemically treated. Graphite is particularly suitable for being formed into pump components because it is (a) soft and relatively easy to machine, (b) not as brittle as ceramics and less prone to breakage, and (c) less expensive than ceramics.

Ceramic, however, is more resistant to corrosion by molten aluminum than graphite. It would therefore be advantageous to develop vertical members used in a molten metal device that are comprised of ceramic, but less costly than solid ceramic members, and less prone to breakage than normal ceramic.

SUMMARY OF THE INVENTION

Disclosed is an insert (or housing) that is positioned in a vessel in order to assist in the transfer of molten metal out of the vessel. In one embodiment, the insert is an enclosed structure defining a cavity and having a first opening in the bottom half of its side and a rectangular outlet at the top. The insert may further includes a launder (or trough) positioned at its top. The rectangular outlet is specially configured to have the proper dimensions to receive the launder. Rather than the outlet being curved or rounded, it is rectangular and has the proper width and depth for the launder to be easily positioned in the outlet. Despite decades of use of systems and devices to transfer molten metal into launders, this refinement in design was not known. Molten metal is moved into the first opening and raises the level of molten metal in the insert cavity, which can have a circular or rectangular cross-section, or both, depending upon the position in the cavity, until the molten metal passes through the rectangular outlet and into a launder, where it can move out of the vessel in which the insert is positioned. The insert can be configured to retain a molten metal pump inside of it, or to have a molten metal pump force metal into an opening in the insert, wherein the molten metal moves upward and out of the rectangular outlet.

The insert can be created by attaching or forming a secondary wall to a wall of the vessel, thus creating a cavity between the two walls. A first opening is formed in the secondary wall and a launder structure is positioned, or formed, at the top of the secondary wall and the wall of the vessel, so that a second opening is formed at the top. Molten metal is forced into the first opening and raises the level of molten metal in the cavity until the molten metal passes through the rectangular outlet and into a launder, where it passes out of the vessel.

DETAILED DESCRIPTION

Figure 1:
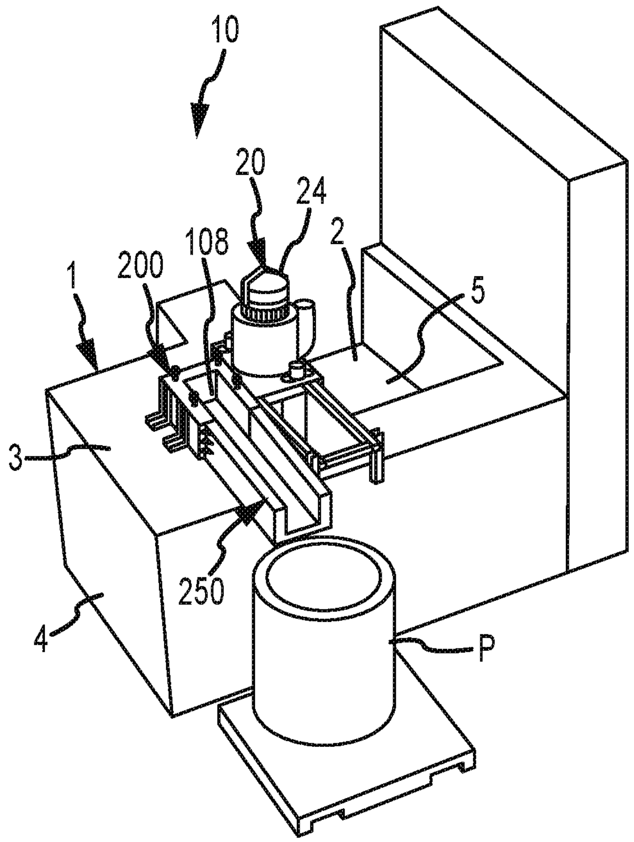
FIG. 1 is a top, perspective view of a system according to this disclosure, wherein the system is installed in a vessel designed to contain molten metal.
Figure 1A:
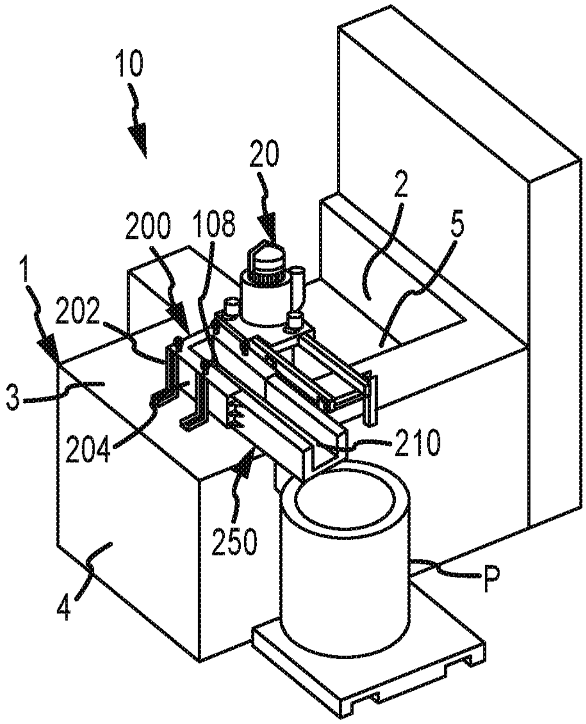
FIG. 1A is another top, perspective view of a system according to FIG. 1.

Turning now to the drawings, where the purpose is to describe a preferred embodiment of the invention and not to limit same, a system and insert according to the invention will be described. FIGS. 1-3 and 7 show a system 10 according to an aspect of the invention, and a vessel 1. Vessel 1 has a well 2, a top surface 3, a side surface 4, a floor 5, and a vessel well 6.

System 10 comprises a molten metal pump 20 and an insert 100. Pump 20 is preferably a circulation pump and can be any type of circulation pump satisfactory to move molten metal into the insert as described herein. The structure of circulator pumps is know to those skilled in the art and one preferred pump for use with the invention is called "The Mini," manufactured by Molten Metal Equipment Innovations, Inc. of Middlefield, Ohio 44062, although any suitable pump may be used. The pump 20 preferably has a superstructure 22, a drive source 24 (which is most preferably a pneumatic motor) mounted on the superstructure 22, support posts 26, a drive shaft 28, and a pump base 30. The support posts 26 connect the superstructure 22 to the base 30 in order to support the superstructure 22.

Drive shaft 28 preferably includes a motor drive shaft (not shown) that extends downward from the motor and that is preferably comprised of steel, a rotor drive shaft 32, that is preferably comprised of graphite, or graphite coated with a ceramic, and a coupling (not shown) that connects the motor drive shaft to end 32B of rotor drive shaft 32.

Figure 5:
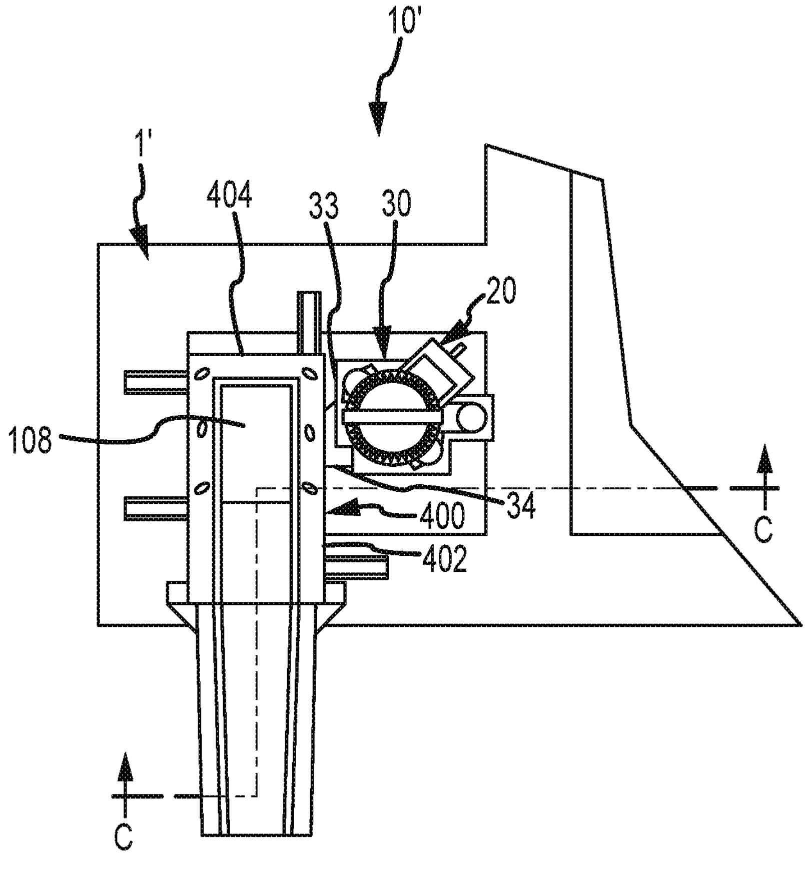
FIG. 5 is a top view of the system of FIG. 4.
Figure 9:
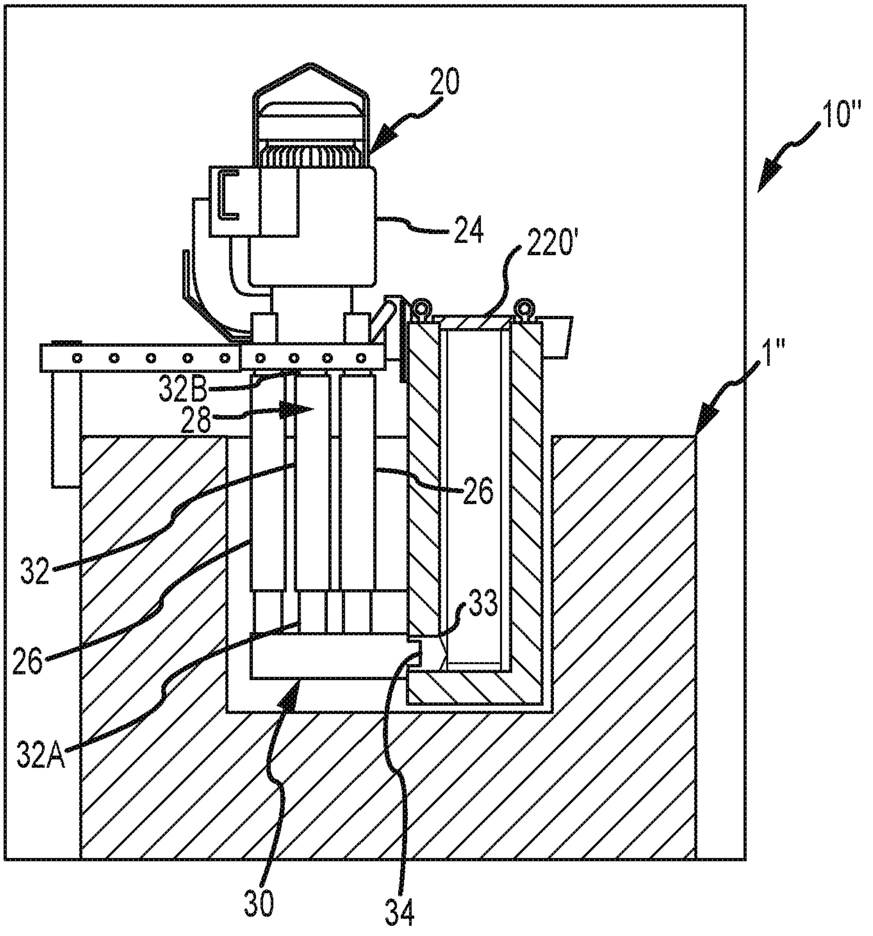
FIG. 9 is a partial, sectional side view of the system of FIG. 8 taken along line A-A.
Figure 10:
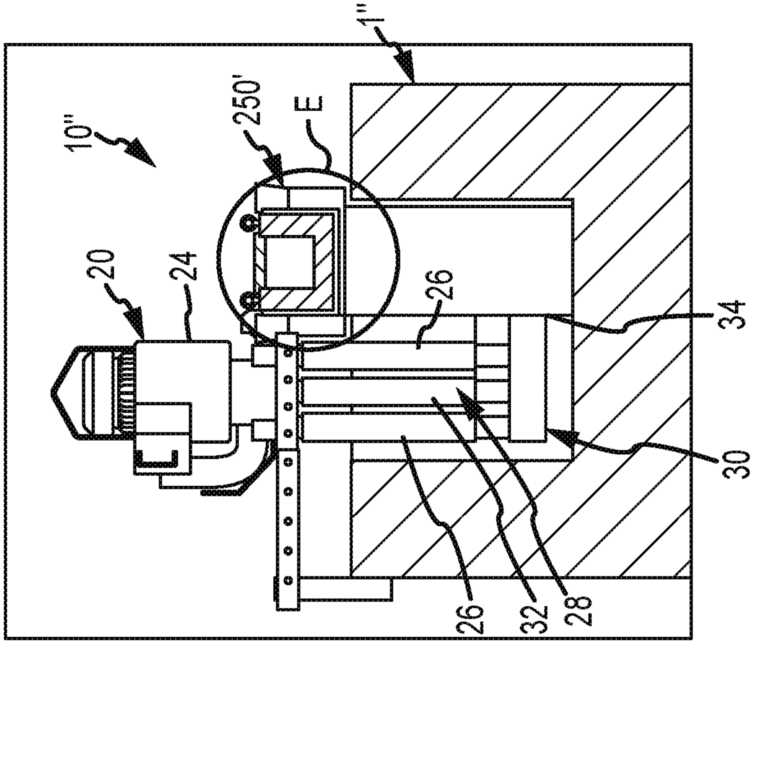
FIG. 10 is a partial sectional view of the system of FIG. 8 taken along line B-B.

The pump base 30 includes an inlet (not shown) at the top and/or bottom of the pump base, wherein the inlet is an opening that leads to a pump chamber (not shown), which is a cavity formed in the pump base. The pump chamber is connected to a tangential discharge, which is known in art, that leads to an outlet, which is an opening in the side wall 33 of the pump base. In the preferred embodiment, the side wall 33 of the pump base including the outlet has an extension 34 formed therein and the outlet is at the end of the extension. This configuration is shown in FIGS. 5, 9 and 10.

A rotor (not shown) is positioned in the pump chamber and is connected to an end of the rotor shaft 32A that is opposite the end of the rotor shaft 32B, which is connected to the coupling.

In operation, the motor rotates the drive shaft, which rotates the rotor. As the rotor (also called an impeller) rotates, it moves molten metal out of the pump chamber, through the discharge and through the outlet.

An insert 100 according to this aspect of the invention includes (a) an enclosed device 102 that can be placed into vessel well 2, and (b) a trough (or launder section) 200 positioned on top of device 102. Device 102 as shown (and best seen in FIGS. 2-3 and 5) is a generally rectangular structure, but can be of any suitable shape or size, wherein the size depends on the height and volume of the vessel well 3 into which device 102 is positioned. The device 102 and trough 200 are each preferably comprised of material capable of withstanding the heat and corrosive environment when exposed to molten metal (particularly molten aluminum). Most preferably the heat resistant material is a high temperature, castable cement, with a high silicon carbide content, such as ones manufactured by AP Green or Harbison Walker, each of which are part of ANH Refractory, based at 400 Fairway Drive, Moon Township, PA 15108, or Allied Materials. The cement is of a type know by those skilled in the art, and is cast in a conventional manner known to those skilled in the art.

Figure 2:
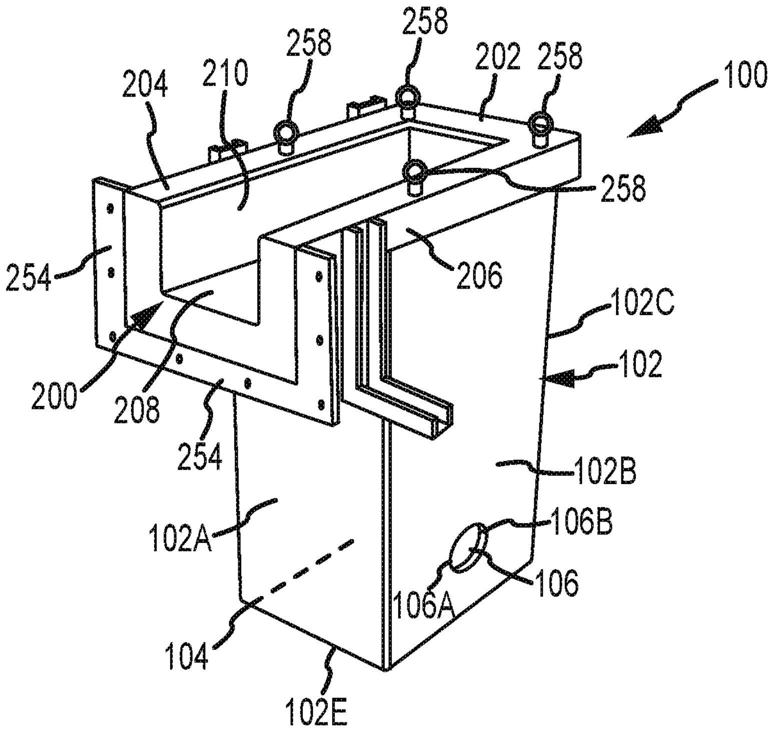
FIG. 2 is a side, perspective view of an insert used with the system of the present disclosure.
Figure 3:
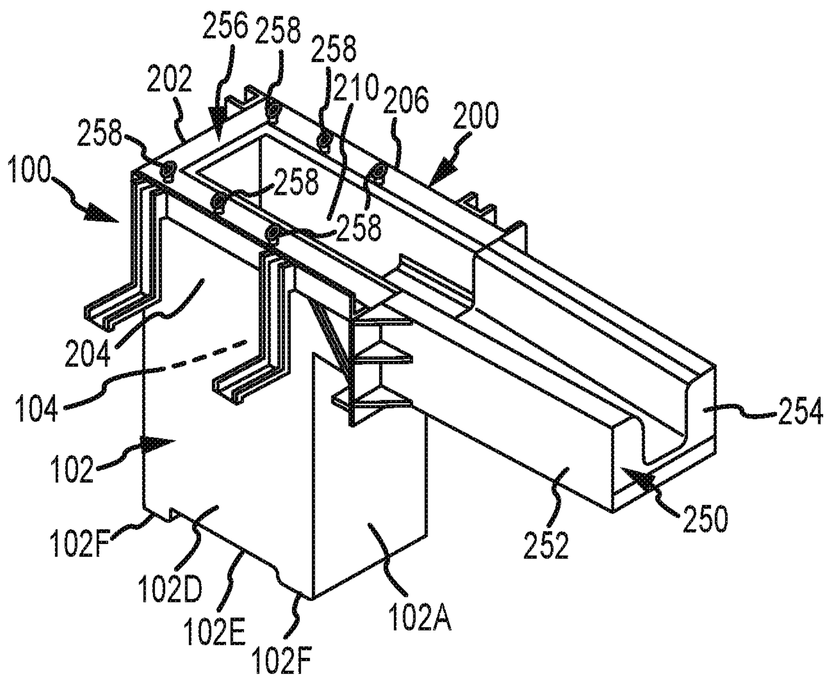
FIG. 3 is a side, perspective view of the insert of FIG. 2 with an extension attached thereto.
Figure 7:
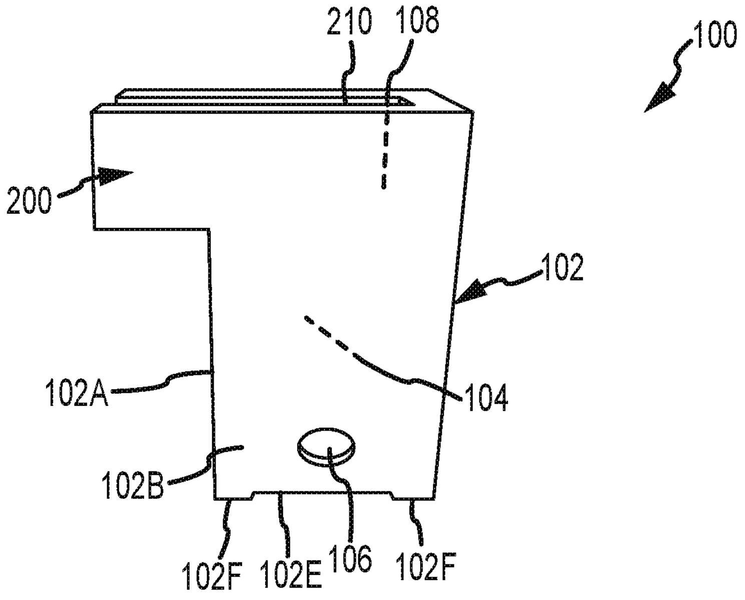
FIG. 7 is a side view of the insert shown in FIG. 2.

Device 102 as shown has four sides 102A, 102B, 102C and 102D, a bottom surface 102E, and an inner cavity 104. Bottom surface 102E may be substantially flat, as shown in FIG. 2, or have one or more supports 102F, as shown in FIGS. 3 and 7.

Side 102B has a first opening 106 formed in its lower half, and preferably no more than 24", or no more than 12", and most preferably no more than 6", from bottom surface 102E. First opening 106 can be of any suitable size and shape, and as shown has rounded sides 106A and 106B. First opening 106 functions to allow molten metal to pass through it and into cavity 104. Most preferably, opening 104 is configured to receive an extension 34 of base 30 of pump 10, as best seen in FIGS. 5, 9 and 10. In these embodiments, the outlet is formed at the end of the extension 34.

Device 102 has a second opening 108 formed in its top. Second opening 108 can be of any suitable size and shape to permit molten metal that enters the cavity 104 to move through the second opening 108 once the level of molten metal in cavity 104 becomes high enough.

Trough 200 is positioned at the top of device 102. Trough 200 has a back wall 202, side walls 204 and 206, and a bottom surface 208. Trough 200 defines a passage 210 through which molten metal can flow once it escapes through second opening 108 in device 102. The bottom surface 208 of trough 200 is preferably angled backwards towards second opening 108, at a preferred angle of 2°-5°, even though any suitable angle could be used. In this manner, any molten metal left in trough 200, once the motor 20 is shut off, will flow backward into opening 108. The bottom surface 208 could, alternatively, be level or be angled forwards away from opening 108. Trough 200 may also have a top cover, which is not shown in this embodiment.

In the embodiment shown in FIGS. 1-3 and 7, the trough 200 at the top of insert 100 is integrally formed with device 102. In a preferred method, after insert 100 is formed, the shape of the launder portion is machined into the top of device 102. Further, part of the front wall 102A is machined away so that trough 200 extends outward from wall 102A, as shown. Trough 200, however, in any embodiment according to the invention, can be formed or created in any suitable manner and could be a separately cast piece attached to device 102.

If trough 200 is a piece separate from device 102, it could be attached to device 102 by metal angle iron and/or brackets (which would preferably made of steel), although any suitable attachment mechanism may be used. Alternatively, or additionally, a separate trough 200 could be cemented to device 200.

An extension 250 is preferably attached to the end of trough 200. Extension 250 preferably has an outer, steel frame 252 about ¼"-⅜" thick and the same refractory cement of which insert 100 is comprised is cast into frame 252 and cured, at a thickness of preferably ¾"-2½". Brackets 260 are preferably welded onto frame 252 and these align with bracket 254 on trough 200. When the holes in brackets 260 align with the holes in bracket 254, bolts or other fasteners can be used to connect the extension 250 to the trough 200. Any suitable fasteners or fastening method, however, may be used. In one embodiment the bracket 254 is formed of ¼" to ⅜" thick angle iron, and brackets 260 are also ¼" to ⅜" thick iron or steel. Preferably, the surfaces of the refractory cement that from the trough and extension that come into contact with the molten metal are coated with boron nitride.

It is preferred that if brackets or metal structures of any type are attached to a piece of refractory material used in any embodiment of the invention, that bosses be placed at the proper positions in the refractory when the refractory piece is cast. Fasteners, such as bolts, are then received in the bosses.

An upper bracket 256 is attached to trough 200. Eyelets 258, which have threaded shafts that are received through upper bracket 256 and into bosses in the refractory (not shown), are used to lift the insert 100 into and out of vessel 1.

Positioning brackets 270 position insert 100 against an inner wall of vessel 1. The size, shape and type of positioning brackets, or other positioning devices, depend on the size and shape of the vessel, and several types of positioning structures could be used for each vessel/insert configuration. The various ones shown here are exemplary only. The positioning structures are usually formed of ⅜" thick steel.

It is also preferred that the pump 20 be positioned such that extension 34 of base 30 is received in the first opening 100. This can be accomplished by simply positioning the pump in the proper position. Further the pump may be head in position by a bracket or clamp that holds the pump against the insert, and any suitable device may be used. For example, a piece of angle iron with holes formed in it may be aligned with a piece of angle iron with holes in it on the insert 100, and bolts could be placed through the holes to maintain the position of the pump 20 relative the insert 100.

In operation, when the motor is activated, molten metal is pumped out of the outlet through first opening 106, and into cavity 104. Cavity 104 fills with molten metal until it reaches the second opening 108, and escapes into the passage 210 of trough 200, where it passes out of vessel 1, and preferably into another vessel, such as the pot P shown, or into ingot molds, or other devices for retaining molten metal. Installation of the insert into a furnace that contains molten metal is preferably accomplished by pre-heating the insert to 300°-400° F. in an oven and then slowly lowering unit into the metal over a period of 1.5 to 2 hours.

Figure 4:
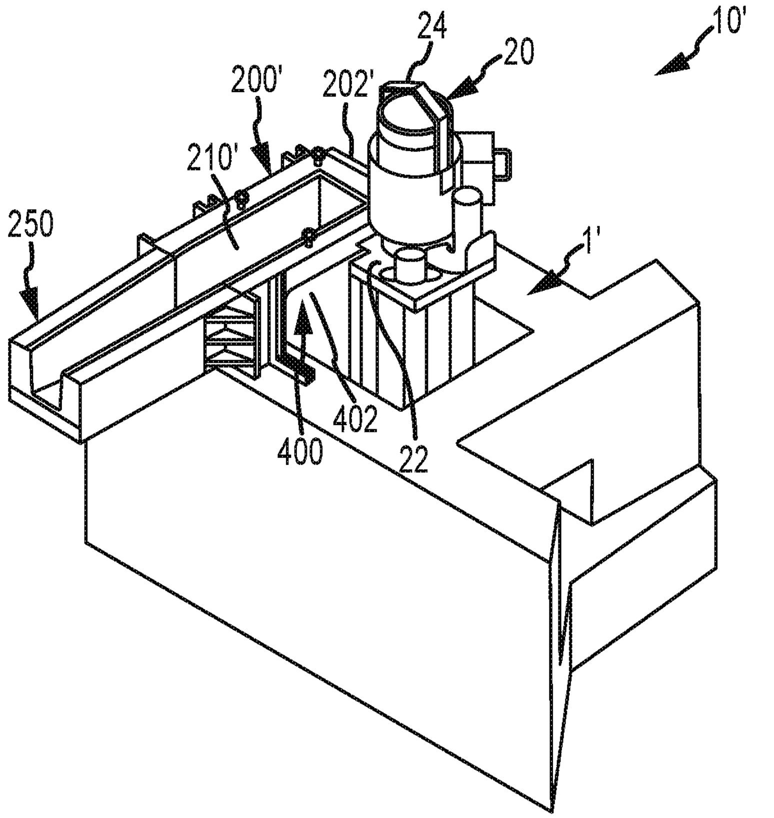
FIG. 4 is a top, perspective view of an alternate system according to this disclosure.
Figure 6:
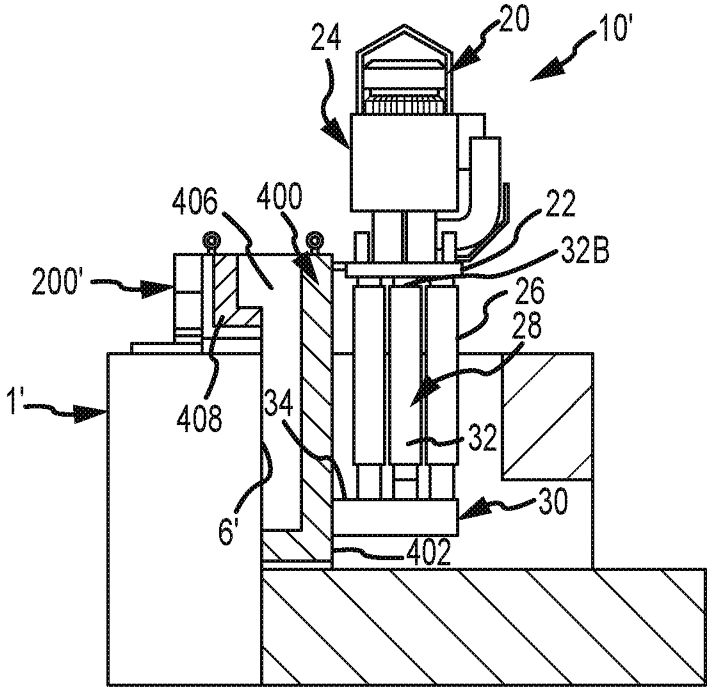
FIG. 6 is a partial, sectional view of the system shown in FIG. 5 taken along line C-C.

In another embodiment of the invention shown in FIGS. 4-6, the insert 100 is replaced by a secondary wall 400 positioned in a different vessel, 1', next to vessel wall 6'. Secondary wall 400 has a side surface 402 and a back surface 404 and is attached to vessel wall 7 by any suitable means, such as being separately formed and cemented to it, or being cast onto, or as part of, wall 6'. A cavity 406 is created between the wall 6' of the vessel and secondary wall 400, and there is an opening (not shown) in secondary wall 400 leading to cavity 406. A launder 200' is positioned on top of the cavity 406, and pump 10 is positioned so that its outlet is in fluid communication with the opening in secondary wall 400 so that molten metal will pass through the opening and into the cavity 406 when the pump is in operation. The trough 200 can be formed as a single piece and positioned on top of cavity 402, or it could be formed onto wall 7 along with secondary wall 400. Alternatively, a separate trough wall 408 could be separately formed and attached to the top of wall 6' in such a manner as to seal against with the top surface of wall 6' and the back section 404 of wall 400. In all other respects the system of this embodiment functions in the same manner as the previously described embodiment. This embodiment also includes extension 250 and can use any suitable attachment or positioning devices to position the insert and pump in a desired location in the vessel 1'.

Another embodiment of the invention is shown in FIGS. 8-12. This embodiment is the same as the one shown in FIGS. 1-3 and 7 except for a modification to the insert and the brackets used. This insert is the same as previously described insert 100 except that side 102A is not machined away. So, the trough 200 does not extend past side 102A.

Figure 8:
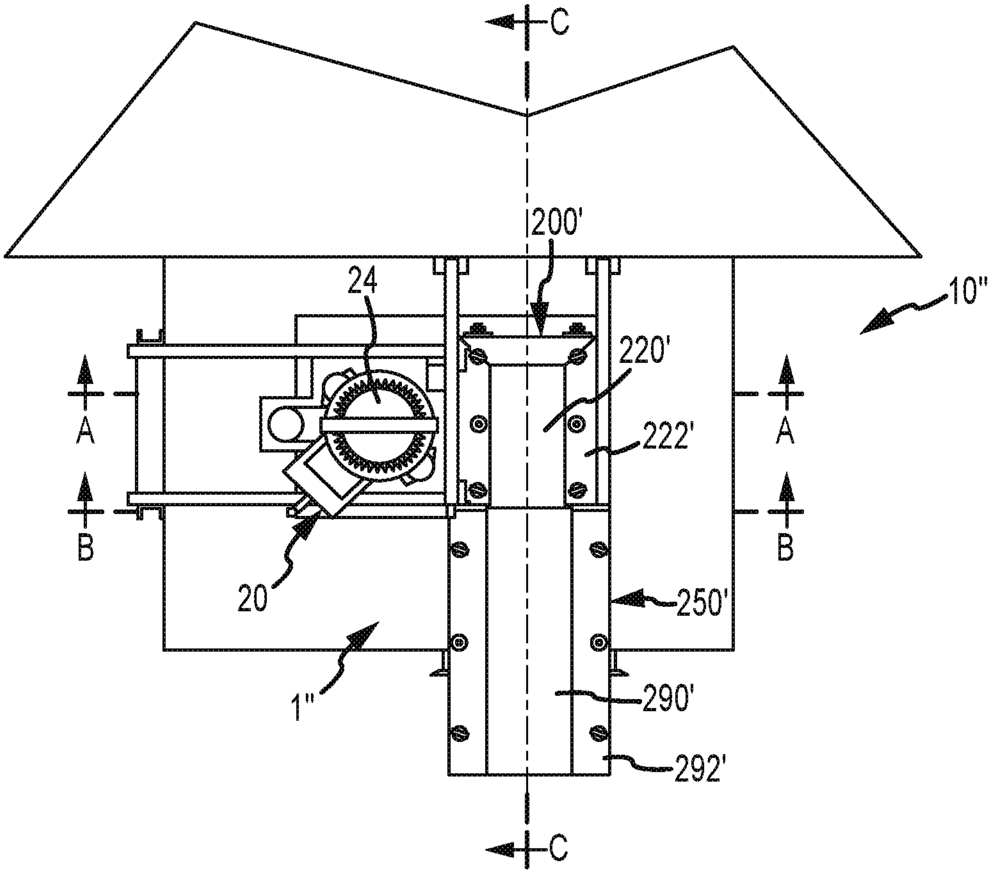
FIG. 8 is a top view of an alternate embodiment of a system according to this disclosure.
Figure 11:
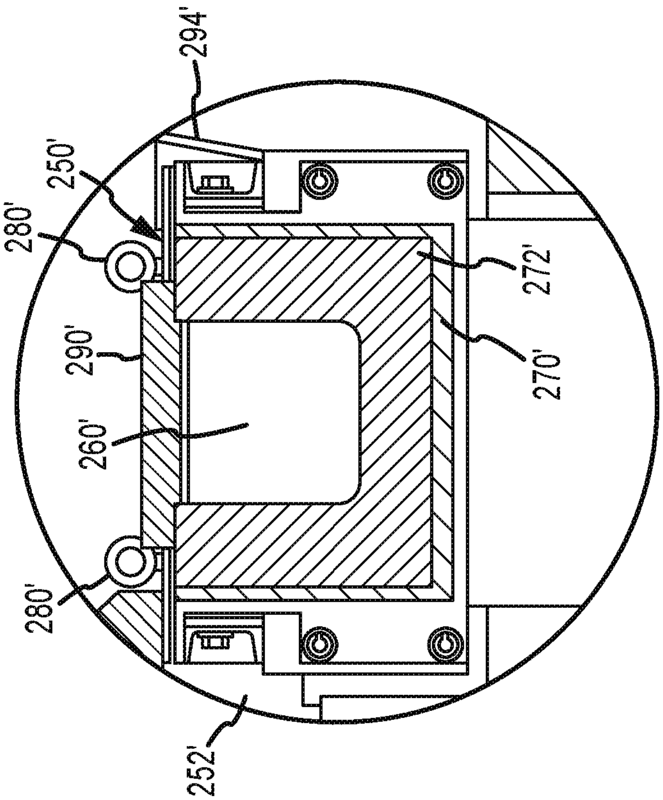
FIG. 11 is a close-up view of Section E of FIG. 10.

FIGS. 8-10 show a bracket structure that hold pump 20 off of the floor of vessel 1" (which has a different configuration than the previously described vessels). FIGS. 8-12, and particularly FIG. 11, show an alternate extension 250'. Extension is 250' formed in the same manner as previously described extension 250, except that it has a layer 270' of insulating concrete between ¼" and 1" thick between the steel outer shell 252' and the cast refractory concrete layer 272'. This type of insulating cement is known to those skilled in the art. Eyelets are included in this embodiment and are received in bosses positioned in the refractory of the extension 250'.

In this embodiment, trough 200' has a top cover 220' held in place by members 222'. Extension 250' has a top cover 290' held in place by members 292'. The purpose of each top cover is to prevent heat from escaping and any suitable structure may be utilized. It is preferred that each top cover 220' and 290' be formed of heat-resistant material, such as refractory cement or graphite, and that members 222' and 292' are made of steel. As shown, a clamp 294' holds member 292' in place, although any suitable attachment mechanism may be used.

Figure 12:
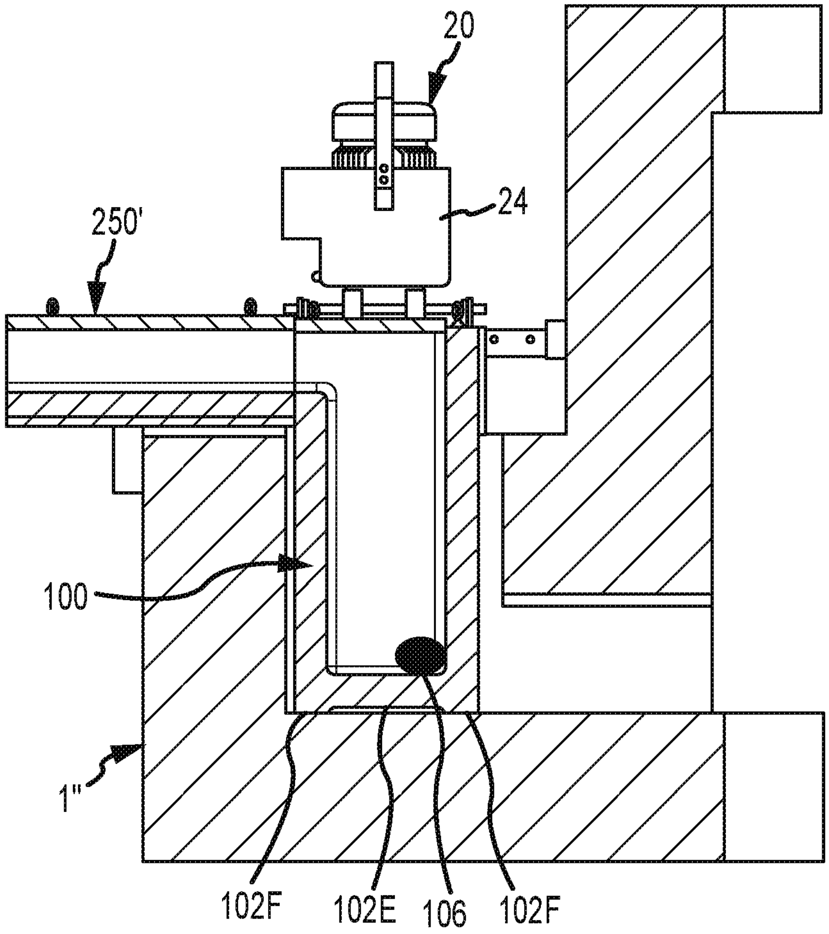
FIG. 12 is a partial sectional view of the system of FIG. 8 taken along line C-C.
Figure 14:
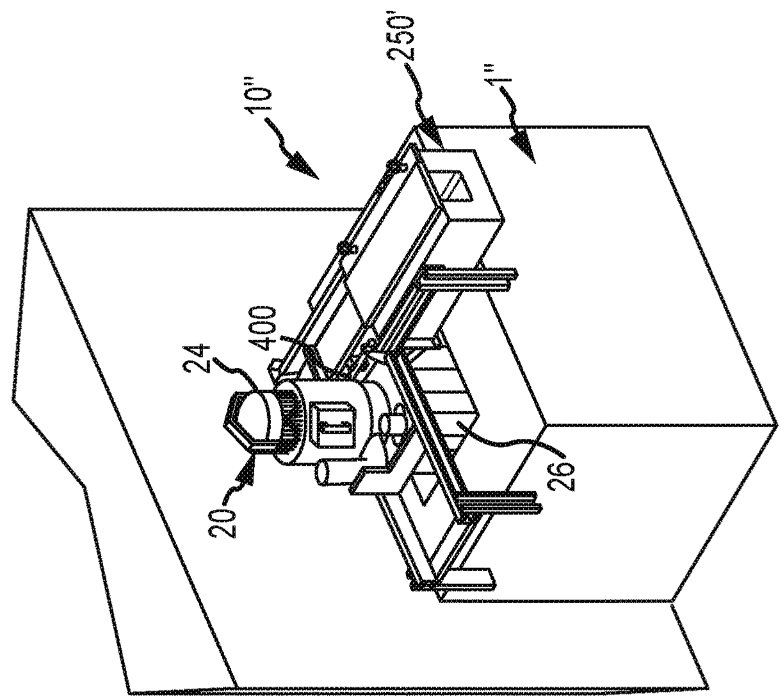
FIG. 14 is a top, perspective view of the system of FIG. 13 positioned in a vessel.
Figure 13:
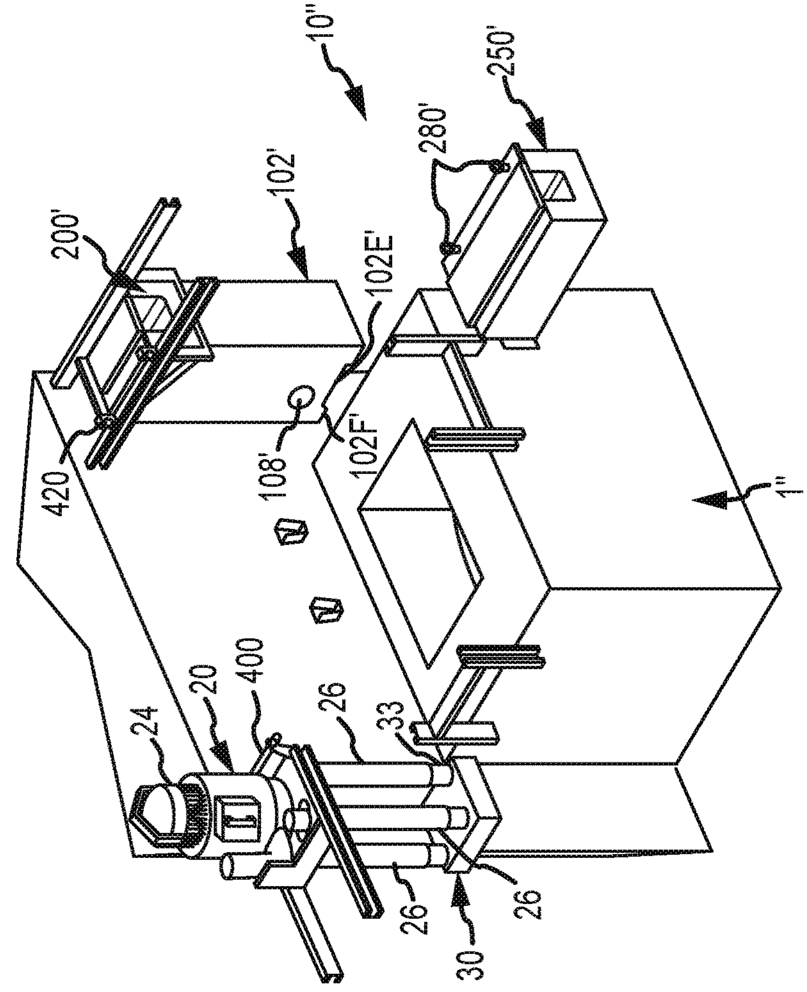
FIG. 13 is an exploded view of the system of FIG. 8 showing an optional bracketing system.
Figure 16:
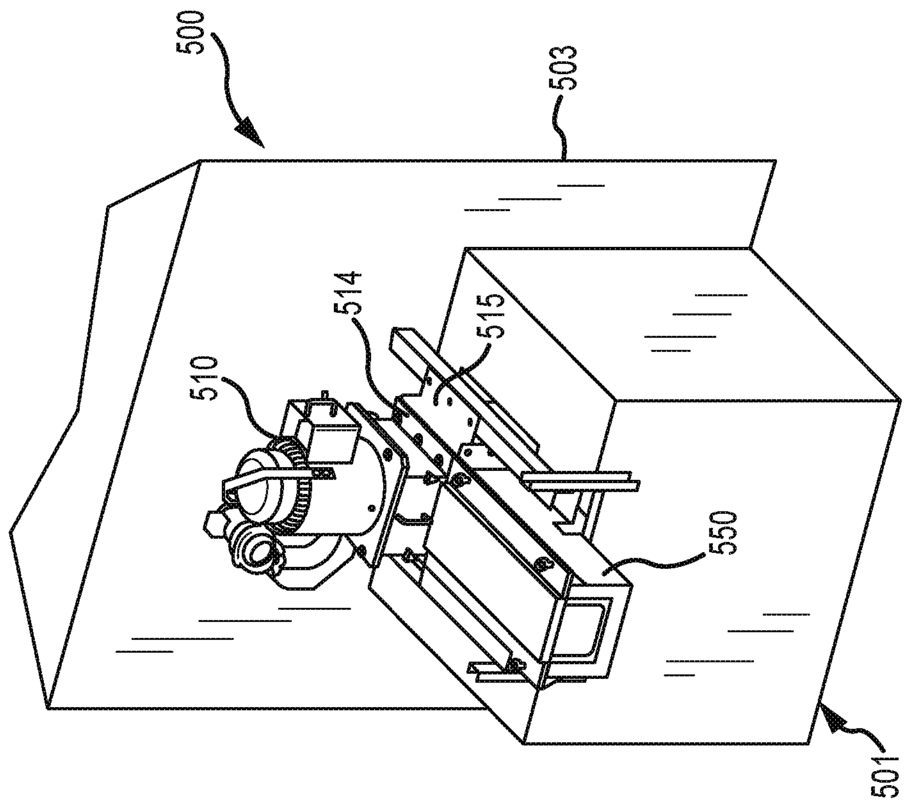
FIG. 16 is an assembled view of the system of FIG. 15.

FIGS. 12 and 13 show the embodiment of the system represented in FIGS. 8-12, with an alternate bracing system to fit the vessel into which the system is being positioned. As previously mentioned, the bracing system is a matter of choice based on the size and shape of the vessel, and different bracing systems could be used for the same application. Another structure for aligning the pump 20 with insert 200' is shown in FIG. 13 bar 400 is received in holders 420.

The support brackets are preferably attached to a steel structure of the furnace to prevent the insert from moving once it is in place. A locating pin on the steel frame allows for alignment of the outlet of the pump with the inlet hole at the bottom.

Figure 15:
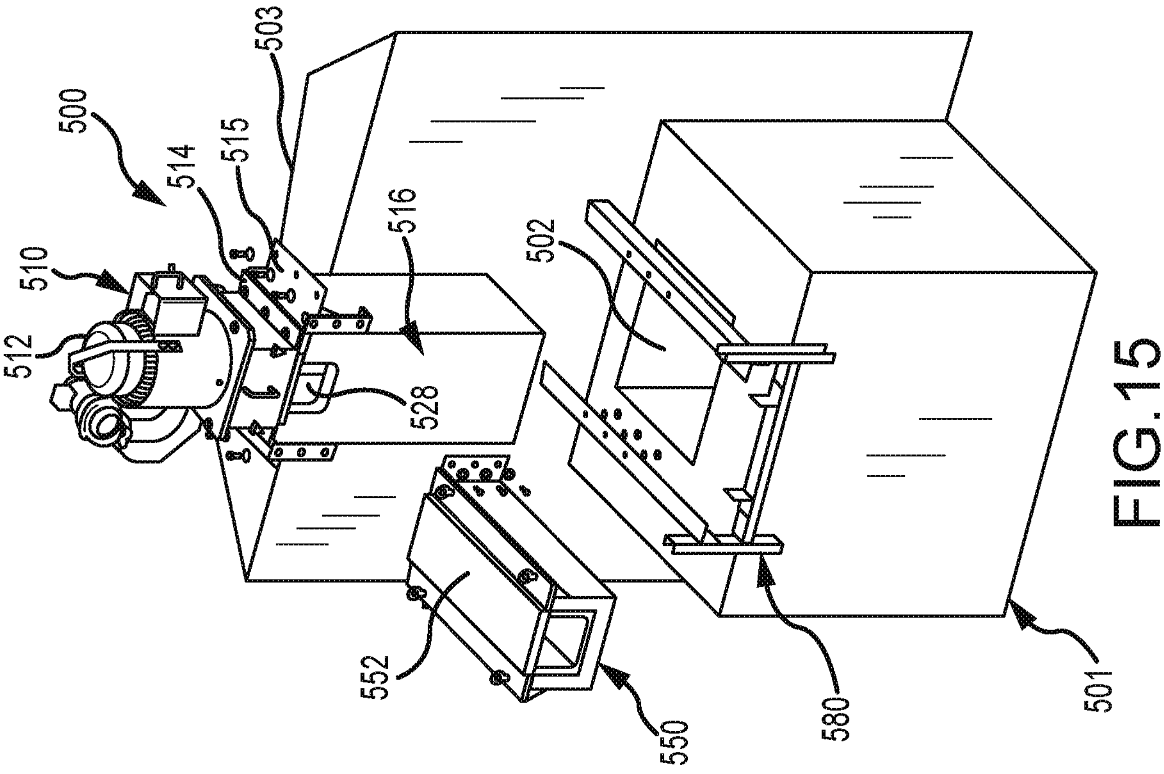
FIG. 15 is a partial, exploded view of an alternate embodiment of a system according to this disclosure.
Figure 17:
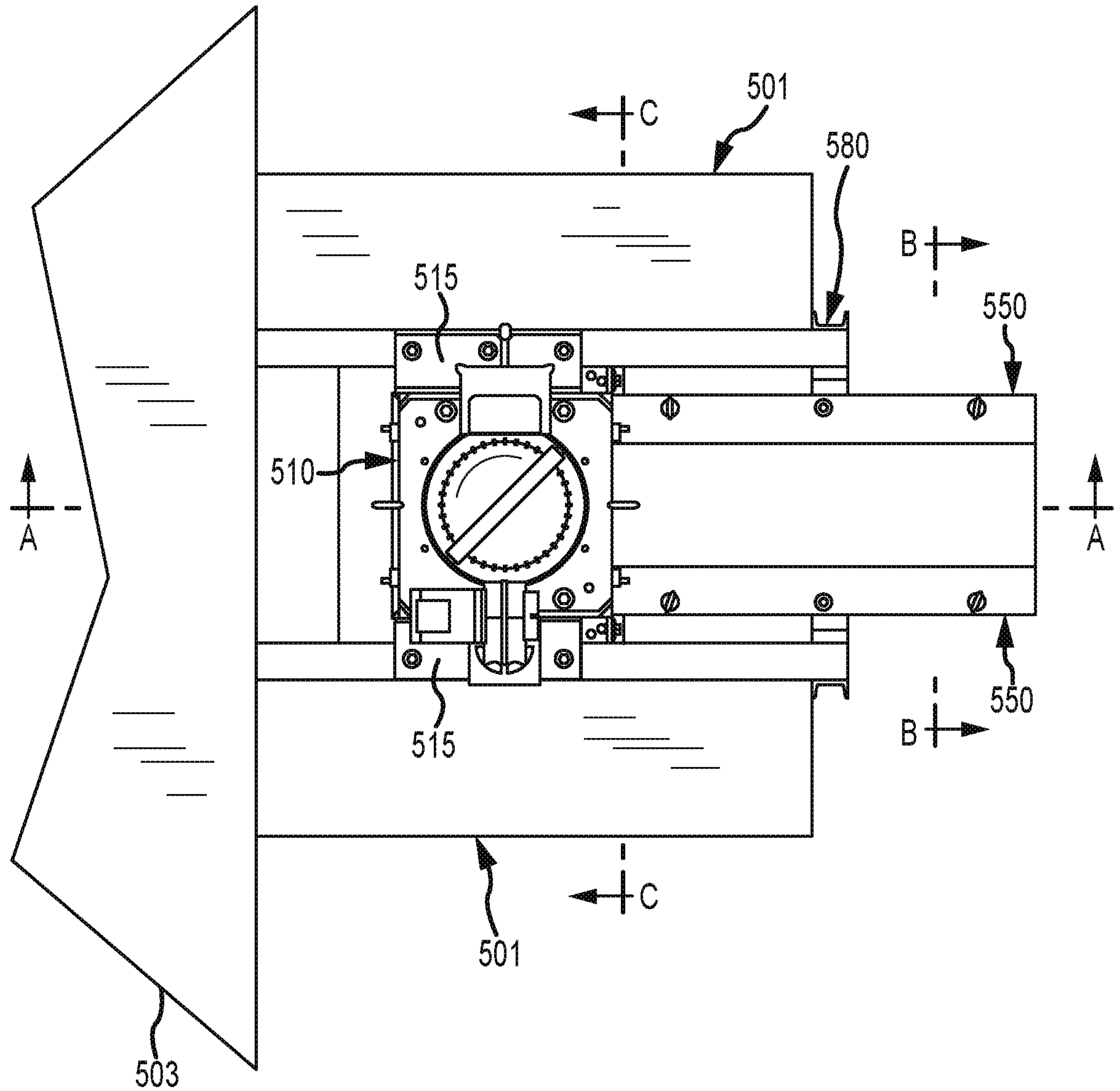
FIG. 17 is a top view of the system of FIG. 16.

FIGS. 15-20 show another embodiment according to aspects of the invention. FIG. 15 is a partial exploded view of a system 500. System 500 includes a pumping device 510, a launder structure 550, and a support structure 580. System 500 fits into the cavity 502 of a vessel 501 that, here, is in fluid communication with a larger vessel of molten metal, which is defined in part by wall 503.

Pumping device 510 includes a motor 512 that rests on a platform 514. Motor 512 can be any suitable type, such as pneumatic or electric. Device 510 also includes a cast housing 516 that acts as a pump chamber and discharge. Cast housing 516 is made of any suitable refractory material and the compositions and methods of making cast housing 516 are known. An advantage of housing 516 is that it can permit system 500 to be placed essentially anywhere in a vessel, and if repairs are required to the pump shaft, rotor or other components, the platform 514 with the motor, shaft and rotor can be disconnected from housing 516 and lifted out vertically. Housing 16 remains in cavity 502, or wherever it has been placed. When the repairs are completed, the pump, rotor shaft and rotor and vertically lowered back into the housing 16 and reconnected to it. Housing 16 is still portable and can be easily moved if desired.

Alternatively, the coupling between the rotor shaft and motor shaft can be disconnected and the rotor shaft and rotor can be removed for repair.

Figure 18:
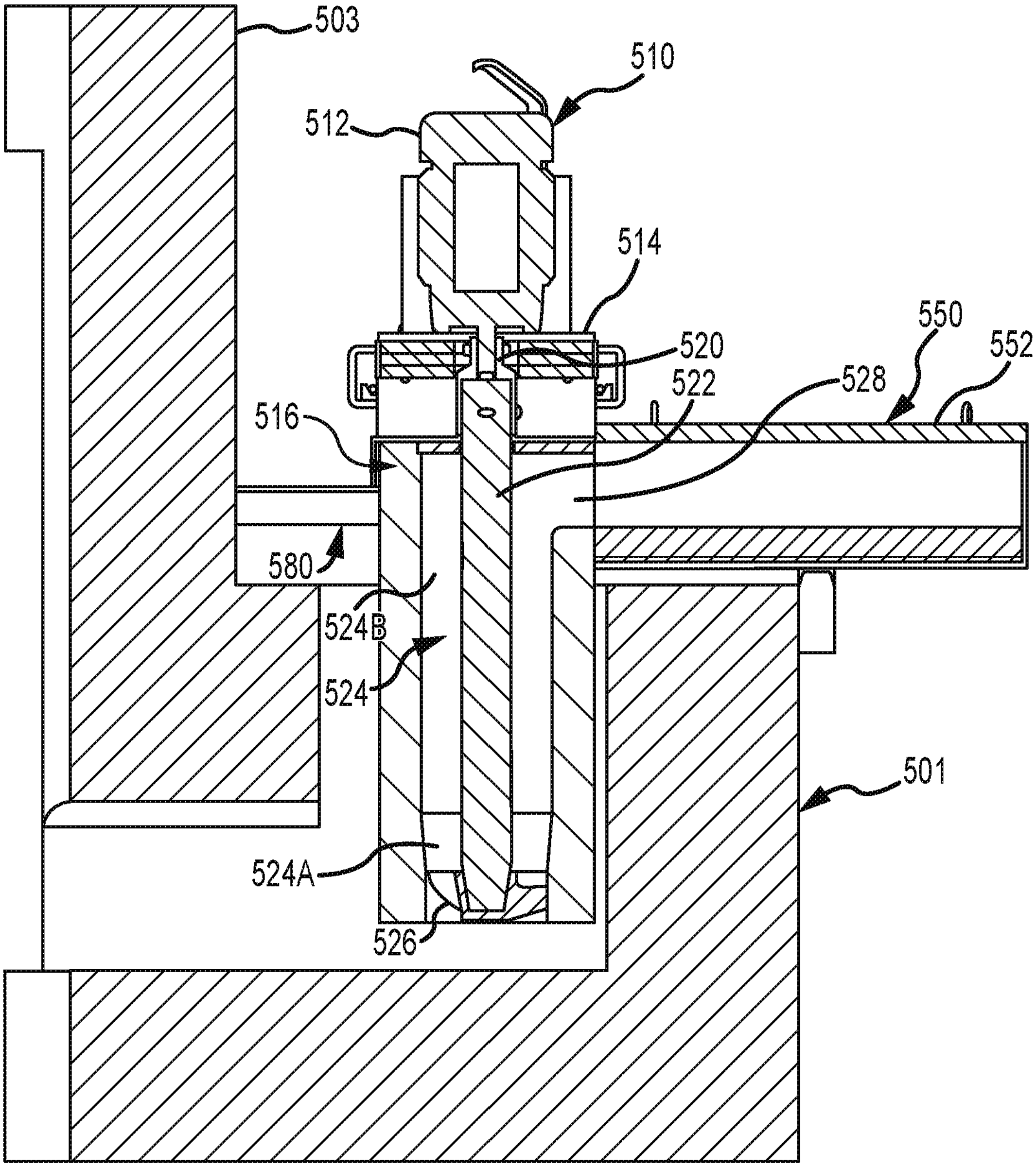
FIG. 18 is a side, partial cross-sectional view of the system of FIG. 17 taken along line A-A.
Figure 19:
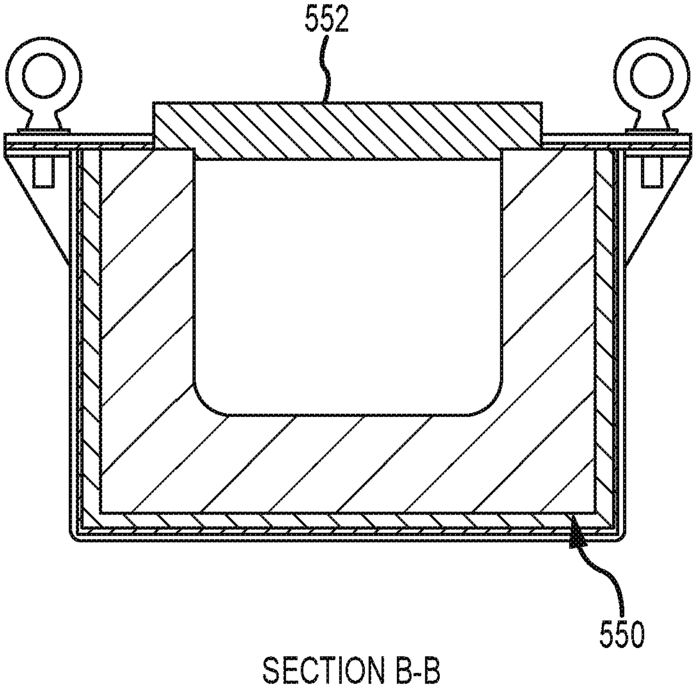
FIG. 19 is a front, cross-sectional view of the launder taken along line B-B of the system of FIG. 17.
Figure 20:
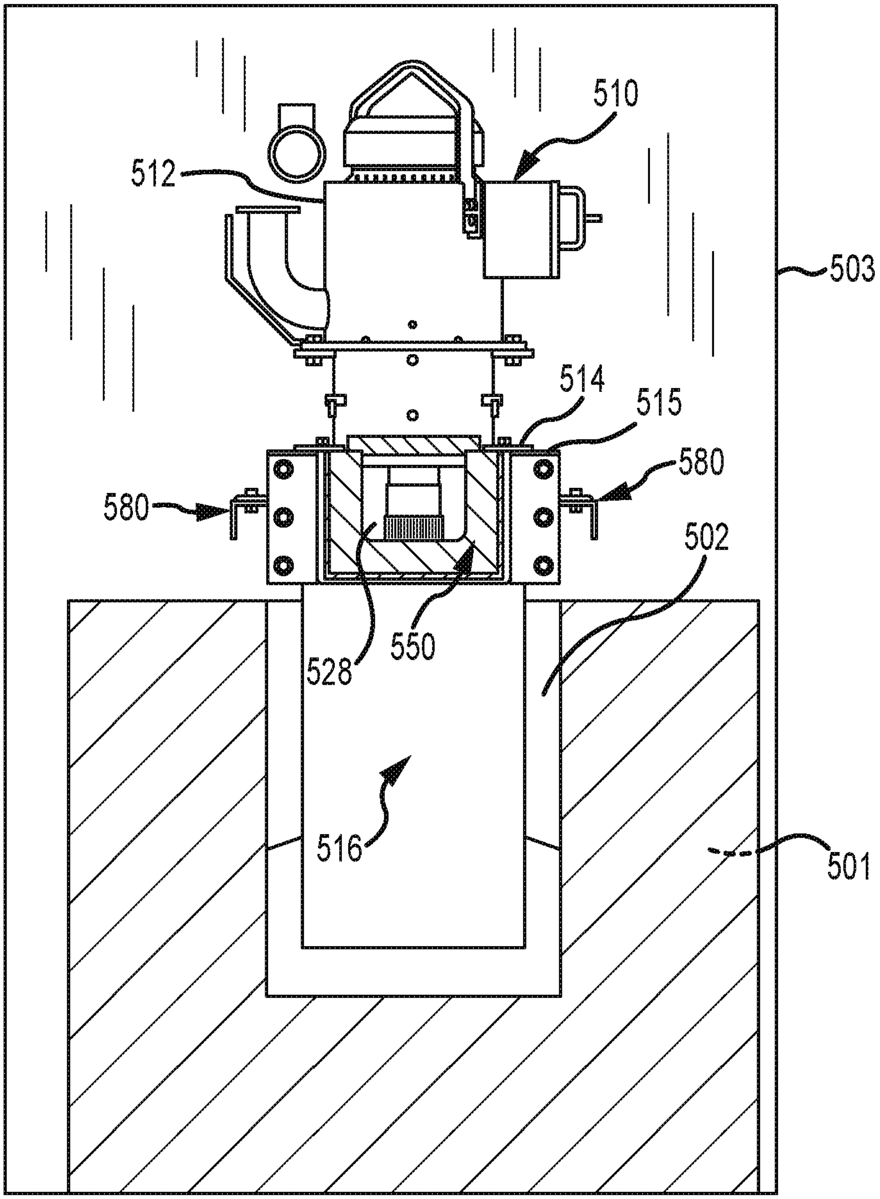
FIG. 20 is a partial, cross-sectional view of the system of FIG. 17 taken along line C-C.
Figure 20A:
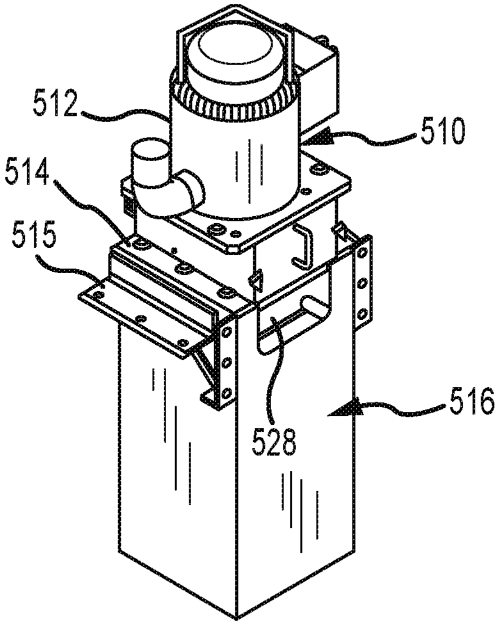
FIG. 20A is a side, perspective view of the cast housing of the system of FIG. 15 including a pump positioned in the housing.
Figure 20B:
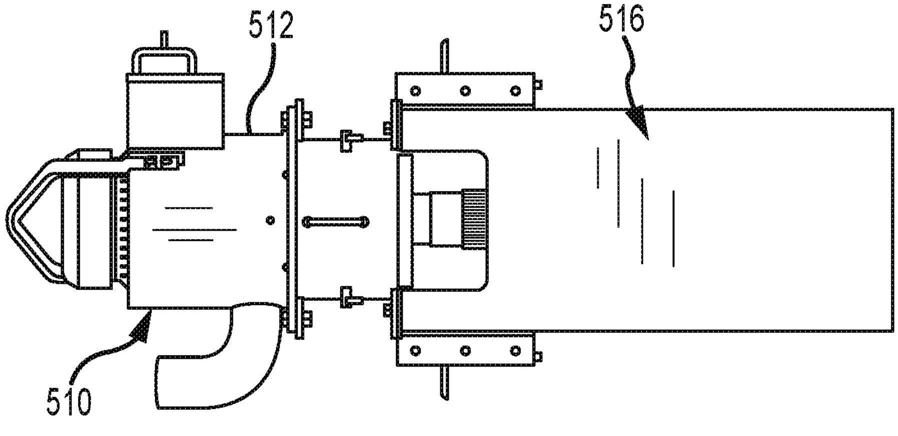
FIG. 20B is a side view of the cast housing of FIG. 20A.
Figure 20C:
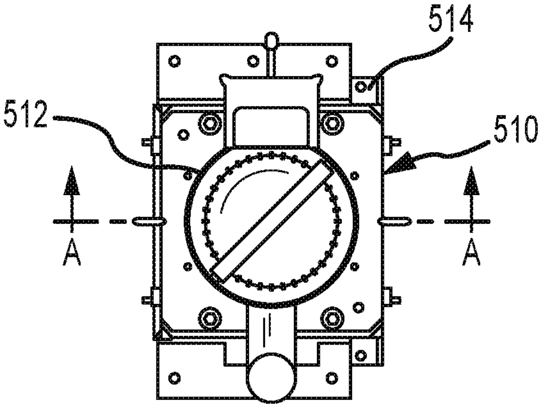
FIG. 20C is a top view of the cast housing of FIG. 20A.
Figure 20D:
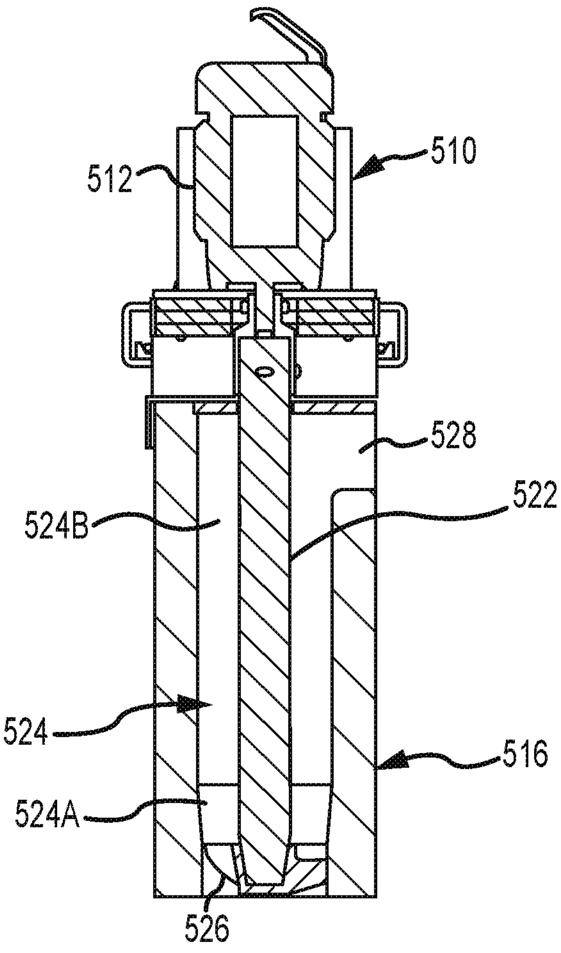
FIG. 20D is a cross-sectional side view of the cast housing of FIG. 20A taken along lines A-A of FIG. 20C.

Cast housing 16 as shown has a square or rectangular outer surface. As best seen in FIG. 18, motor 512 has a motor shaft 520 that is connected to a rotor shaft 522, preferably by any suitable coupling. Rotor shaft 522 passes through a vertical transfer chamber, or uptake tube, 524 that has a lower, first portion 524A having a tapered, first cross-sectional area and an upper, second portion 524B having a second cross-sectional area. The first cross-sectional area is smaller than the second cross-sectional area and narrows into an area in which a rotor 526 is received. Rotor 526 is connected in any suitable manner to rotor shaft 522 and when positioned properly in first portion 524A, there is preferably a ¼" or less gap between the outermost part of the rotor and the inner wall of first portion 524A. This is to create sufficient pressure to drive molten metal upward into uptake tube 524, although any suitable dimensions that will achieve this goal may be used.

When molten metal is pushed up the uptake tube 524 it exits through rectangular outlet 528 and into launder 550. Launder 550 may be of any suitable design, but is preferably between 1" and 10" deep and may either have an open or closed top, and as shown herein it has a top 552. The launder is preferably formed at a 0° horizontal angle, or at a horizontal angle wherein it tilts back towards outlet 528. Such an angle back towards outlet 528 is preferably 1-10°, 1-5° or 1-3°, or a backward slope of ⅛" for every 10' of launder length.

Motor 510 is retained on housing 16 by metal brackets and any suitable structure will suffice. Launder 550 is fastened into place on housing 16 by metal brackets and fasteners, which are also known in the art, and its weight is preferably supported at least in part by support structure 580 and by the top surface of vessel 501.

As shown support structure 580 is a metal bracket and I-beam structure that fastens to the upper surface of vessel 1 and to brackets 515 extending from motor device 510 and to launder 500 in order to secure system 500 in the proper position.

Turning to FIGS. 21-24, some inserts (or cast housings, even though they need not be formed by being cast) that may be used with aspects of the disclosure are shown. Each of inserts 21-24 have a rectangular outlet configured to easily receive an end of a launder, which has an outer, rectangular frame or shape. In the post, the openings leading to the launder have been curved or circular, so cement had to be used to fill gaps at the connection, or an intermediate connection piece was required. The width of each rectangular outlet is preferably 1⁄32"-½" greater than the width of a launder to be used, and height is preferably from 2" greater and 2" less, from 1" greater and 1" less, or ½" greater and ½" less, or 3" greater to 3" less, or 6" greater to 6" less than the height of the launder.

Figure 21:
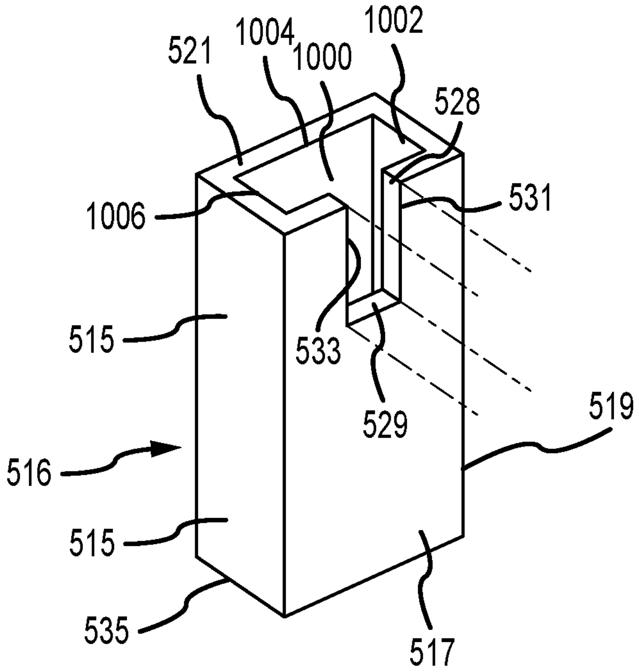
FIG. 21 is a front, perspective view of a cast housing according to this disclosure.

FIG. 21 shows insert 516, which has a rectangular outer surface with side walls 515, 519, a front wall 517, and a back wall (not shown). Insert 516 has a top surface 521, a rectangular cavity 1000 that extends from approximately bottom 535 to top surface 521. Cavity 1000 has two side surfaces 1002, 1006, and a rear surface 1004. Rectangular opening 528 has two sides 528, 533 and a bottom 529. Insert 516 may be configured to receive a molten metal pump as previously described, or may have molten metal pushed into an opening at or near bottom 535, so the molten metal moves upward in cavity 1000 until it exits outlet 528.

Figure 22:
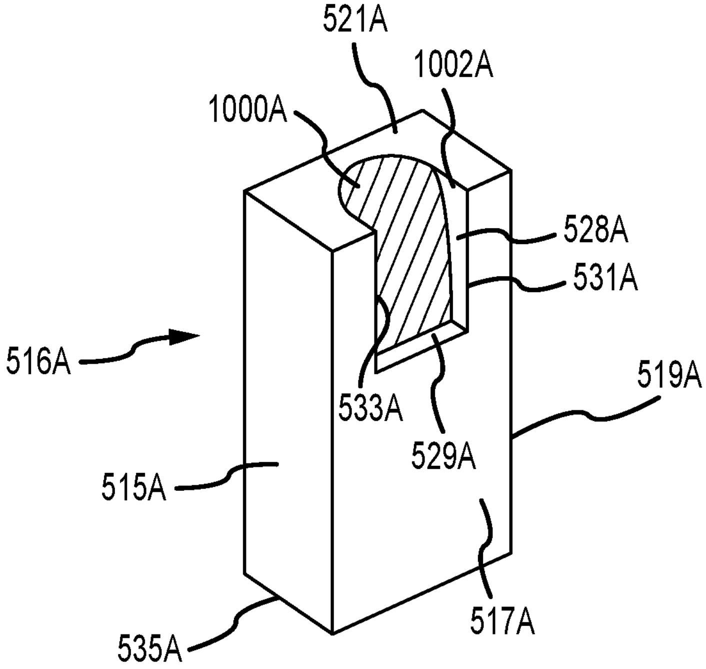
FIG. 22 is a front, perspective view of an alternate cast housing according to this disclosure.

FIG. 22 shows insert 516A, which has a rectangular outer surface with side walls 515A, 519A, a front wall 517A, and a back wall (not shown). Insert 516A has a top surface 521A, a cylindrical cavity 1000 that extends from approximately bottom 535A to top surface 521A, and that has an annular inner surface 1002. Rectangular opening 528A has two sides 528A, 533A and a bottom 529A. Insert 516A may be configured to receive a molten metal pump as previously described, or may have molten metal pushed into an opening, such as opening 1010, at or near bottom 535A, so the molten metal moves upward in cavity 1000A until it exits outlet 528.

Figure 23:
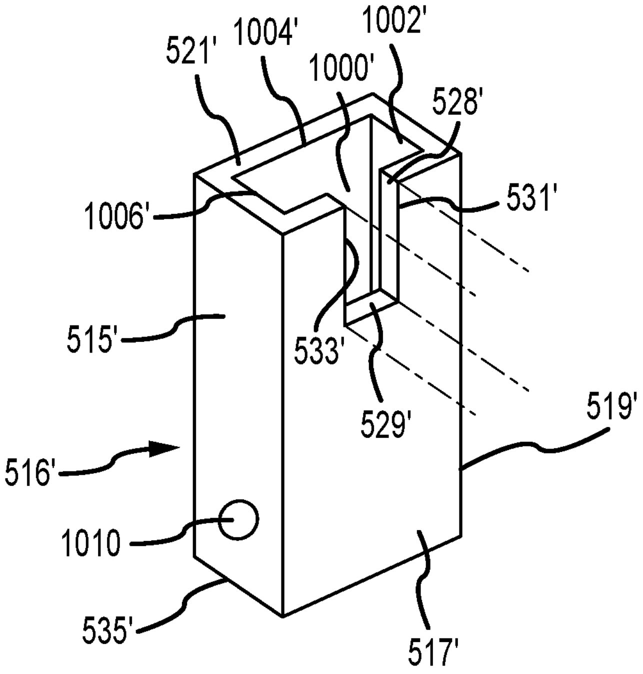
FIG. 23 is a front, perspective view of an alternate cast housing according to this disclosure.

FIG. 23 shows insert 516', which has a rectangular outer surface with side walls 515', 519', a front wall 517', and a back wall (not shown). Insert 516' has a top surface 521', a rectangular cavity 1000' that extends from approximately bottom 535' to top surface 521'. Cavity 1000' has two side surfaces 1002', 1006', and a rear surface 1004'. Rectangular opening 528' has two sides 528', 533' and a bottom 529'. Insert 516' may be configured to receive a molten metal pump as previously described, or may have molten metal pushed into an opening, such as opening 1010', at or near bottom 535', so the molten metal moves upward in cavity 1000' until it exits outlet 528'.

Figure 24:
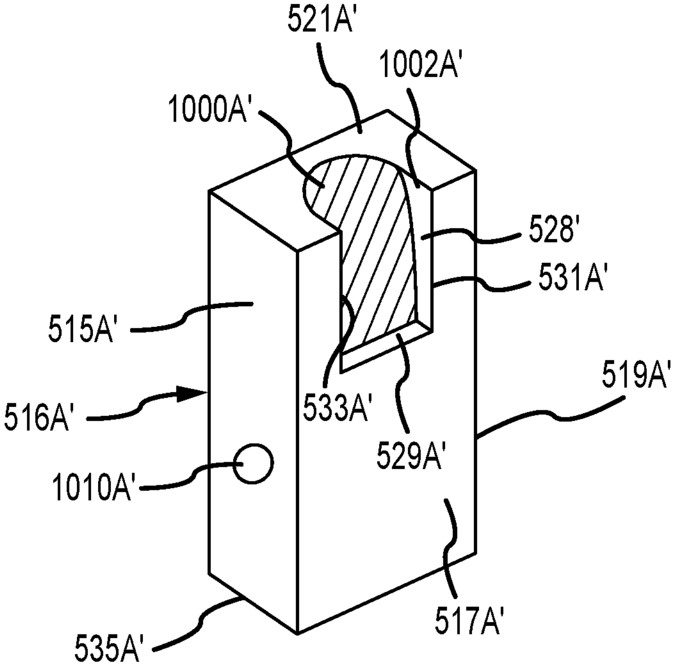
FIG. 24 is a front, perspective view of an alternate cast housing according to this disclosure.

FIG. 24 shows insert 516A', which has a rectangular outer surface with side walls 515A', 519A', a front wall 517A', and a back wall (not shown). Insert 516A' has a top surface 521A', a cylindrical cavity 1000A' that extends from approximately bottom 535A' to top surface 521A', and that has an annular inner surface 1002A'. Rectangular opening 528A' has two sides 528A', 533A' and a bottom 529A'. Insert 516A' may be configured to receive a molten metal pump as previously described, or may have molten metal pushed into an opening, such as opening 1010A', at or near bottom 535A', so the molten metal moves upward in cavity 1000A' until it exits outlet 528'.

Having thus described some embodiments of the invention, other variations and embodiments that do not depart from the spirit of the invention will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired result.

What is claimed is:

1. A method of adding positioning a free-standing, transportable molten metal transfer device into a vessel cavity, the method comprising the steps of:

(a) lifting and moving a free-standing, transportable transfer device into the vessel cavity, wherein the free-standing, transportable transfer device is not constructed as part of the vessel and comprises a housing having a top, a first side, a second side, a third side, a fourth side, an enclosed bottom, an outer surface, an uptake section in the housing, wherein the uptake section is open and configured so molten metal can be moved upwards into the uptake section; a rectangular outlet in one of the first side, the second side, the third side, and the fourth side, wherein the rectangular outlet is in fluid communication with the uptake section; and an inlet in either the first side, the second side, the third side, or the fourth side, wherein the inlet is beneath the rectangular outlet and is in fluid communication with the uptake section; and (b) positioning a molten metal pump at least partially into the uptake section of the free-standing, transportable device such that a rotor and at least part of a drive shaft of the molten metal pump are positioned in the uptake section and a motor of the pump is above the rectangular outlet and outside of the uptake section, wherein as the drive shaft and rotor rotate molten metal entering the uptake section through the inlet is moved upwards and exits the rectangular outlet.

2. The method of claim 1, wherein the step of positioning the molten metal pump into the uptake section is performed before the step of lifting and moving the free-standing, transportable transfer device.

3. The method of claim 1, wherein the step of positioning the molten metal pump into the uptake section is performed after the step of lifting and moving the free-standing, transportable transfer device.

4. The method of claim 1 that further includes the step of positioning an end of a launder in the rectangular outlet.

5. The method of claim 4 that further includes the step of operating the pump and pumping molten metal out of the rectangular outlet and into the launder.

6. The method of claim 1, wherein the enclosed bottom of the free-standing, transportable transfer device rests on a bottom of the vessel cavity after the free-standing, transportable device has been moved into the vessel cavity.

7. The method of claim 1, wherein the uptake section comprises a first section and a second section, wherein the first section is beneath the second section and the first section has a width that is less than a width of the second section.

8. The method of claim 7, wherein the first section and the second section are both cylindrical.

9. The method of claim 1 that further includes the step of operating the pump.

10. The method of claim 1, wherein the free-standing, transportable transfer device has an upper perimeter at the top, and that further includes the step of attaching the molten metal pump to at least the upper perimeter of the transfer chamber in order to support the molten metal pump.

11. The method of claim 1, wherein the molten metal pump includes one or more brackets to connect to the free-standing, transportable transfer device, and that further includes the step of attaching the molten metal pump to the free-standing, transportable transfer device.

12. The method of claim 1, wherein the rectangular outlet is at least two feet above the inlet.

13. The method of claim 1, wherein the rotor has a diameter, and the uptake section has an interior diameter, and the interior diameter is between ⅛" to 1" greater than the diameter of the rotor at the location at which the rotor is positioned in the uptake section.

14. The method of claim 1, wherein the pump does not include a pump base.

15. The method of claim 1, wherein the pump does not include support posts.

16. The method of claim 1, wherein the drive shaft comprises a motor shaft coupled to a rotor shaft and the rotor shaft is positioned at least partially in the uptake section.

17. The method of claim 7, wherein the rotor shaft is connected to the rotor and is configured to have a length such that the rotor is positioned in the first section of the uptake section when the molten metal pump is positioned in the free-standing, transportable transfer device.

18. The method of claim 1, wherein the free-standing, transportable transfer device is comprised of refractory material.

19. The method of claim 1, wherein the inlet is flush with the outer surface.

20. The method of claim 1, wherein the rectangular outlet is flush with the outer surface.

* * * * *